(12) United States Patent
Yerramalli et al.

(10) Patent No.: US 9,942,801 B2
(45) Date of Patent: Apr. 10, 2018

(54) TECHNIQUES FOR RESERVING A CHANNEL OF A RADIO FREQUENCY SPECTRUM

(71) Applicant: QUALCOMM Incorporated, San Diego, CA (US)

(72) Inventors: Srinivas Yerramalli, San Diego, CA (US); Tao Luo, San Diego, CA (US); Siddhartha Mallik, San Diego, CA (US); Xiaoxia Zhang, San Diego, CA (US); Aleksandar Damnjanovic, Del Mar, CA (US); Kiran Kumar Somasundaram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 14/968,339

(22) Filed: Dec. 14, 2015

(65) Prior Publication Data

US 2016/0174109 A1  Jun. 16, 2016

Related U.S. Application Data

(60) Provisional application No. 62/092,037, filed on Dec. 15, 2014.

(51) Int. Cl.
*H04W 28/26* (2009.01)
*H04W 16/14* (2009.01)
(Continued)

(52) U.S. Cl.
CPC ........... *H04W 28/26* (2013.01); *H04W 16/14* (2013.01); *H04W 72/0446* (2013.01); *H04W 74/08* (2013.01); *H04W 72/1215* (2013.01)

(58) Field of Classification Search
CPC ..... H04W 28/26; H04W 16/14; H04W 72/04; H04W 72/0446; H04W 72/12; H04W 72/1215; H04W 74/08
See application file for complete search history.

(56) References Cited

U.S. PATENT DOCUMENTS

| 9,674,825 B2 * | 6/2017 | Yerramalli | H04W 72/042 |
| 2015/0055541 A1 * | 2/2015 | Zhang | H04W 72/005 370/312 |

(Continued)

FOREIGN PATENT DOCUMENTS

| EP | 1503606 A1 | 2/2005 |
| WO | WO-2012135491 A1 | 10/2012 |

OTHER PUBLICATIONS

ISA/EPO, International Search Report and Written Opinion of the International Searching Authority, Int'l Appl. No. PCT/US2015/65786, dated Mar. 9, 2016, European Patent Office, Rijswijk, NL, 13 pgs.

(Continued)

*Primary Examiner* — Tri H Phan
(74) *Attorney, Agent, or Firm* — Liem T. Do

(57) ABSTRACT

Techniques are described for wireless communication. A first method includes contending for access to a first channel of a radio frequency spectrum, and transmitting, upon winning contention for access to the first channel, a first channel reservation indication. The contending may be performed by a first node operating according to a first radio access technology. The first channel reservation indication may be understood by a second node operating according to a second radio access technology.

28 Claims, 14 Drawing Sheets

(51) Int. Cl.
  *H04W 72/04* (2009.01)
  *H04W 74/08* (2009.01)
  *H04W 72/12* (2009.01)

(56) References Cited

U.S. PATENT DOCUMENTS

| | | | | |
|---|---|---|---|---|
| 2015/0103777 | A1* | 4/2015 | Chen | H04L 5/0044 370/329 |
| 2015/0110066 | A1* | 4/2015 | Gaal | H04W 72/0453 370/330 |
| 2015/0181453 | A1* | 6/2015 | Chen | H04L 1/0026 370/252 |
| 2015/0319784 | A1* | 11/2015 | Bhushan | H04W 74/0816 370/329 |
| 2015/0341921 | A1* | 11/2015 | Chen | H04W 72/0413 370/329 |
| 2015/0358826 | A1* | 12/2015 | Wei | H04W 74/0816 370/329 |
| 2016/0057770 | A1* | 2/2016 | Yerramalli | H04B 7/0811 370/329 |
| 2016/0095120 | A1* | 3/2016 | Gaal | H04L 5/0007 370/329 |
| 2016/0150536 | A1* | 5/2016 | Valliappan | H04W 74/0816 370/329 |
| 2016/0174215 | A1* | 6/2016 | Zhang | H04W 72/0413 370/329 |
| 2017/0257854 | A1* | 9/2017 | Yerramalli | H04W 74/002 |

OTHER PUBLICATIONS

Qualcomm Incorporated, "Solutions for Required Functionalities and Design Targets," 3GPP TSG RAN WG1 #78bis, R1-144000, Ljubljana, Slovenia, Oct. 6-10, 2014, 5 pgs., XP_50869665A, 3rd Generation Partnership Project.

Ratasuk et al., "License-Exempt LTE Deployment in Heterogeneous Network," 2012 International Symposium on Wireless Communication Systems (ISWCS), Paris, Aug. 28-31, 2012, pp. 246-250, ISBN 978-1-4673-0762-8, Institute of Electrical and Electronics Engineers.

Weinmiller et al., "Analyzing and Improving the IEEE 802.11-MAC Protocol for Wireless LANs," Proceedings of the Fourth International Workshop on Modeling, Analysis, and Simulation of Computer and Telecommunication Systems, 1996, MASCOTS '96, San Jose, CA, Feb. 1-3, 1996, pp. 200-206, ISBN 0-8186-7235-8, Institute of Electrical and Electronics Engineers.

* cited by examiner

TECHNIQUES FOR RESERVING A CHANNEL OF A RADIO FREQUENCY SPECTRUM

CROSS REFERENCES

The present Application for Patent claims priority to U.S. Provisional Patent Application No. 62/092,037 by Yerramalli et al., entitled "Techniques for Reserving a Channel of a Radio Frequency Spectrum," filed Dec. 15, 2014, assigned to the assignee hereof, and expressly incorporated by reference herein.

BACKGROUND

Field of the Disclosure

The present disclosure, for example, relates to wireless communication systems, and more particularly to techniques for reserving a channel of a radio frequency spectrum.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communication between a base station and a UE over a shared radio frequency spectrum, or over different radio frequency spectrums (e.g., a dedicated radio frequency spectrum and a shared radio frequency spectrum) of a cellular network. With increasing data traffic in cellular networks that use a dedicated (e.g., licensed) radio frequency spectrum, offloading of at least some data traffic to a shared radio frequency spectrum may provide a cellular operator with opportunities for enhanced data transmission capacity. A shared radio frequency spectrum may also provide service in areas where access to a dedicated radio frequency spectrum is unavailable.

Prior to gaining access to and communicating over a shared radio frequency spectrum, a base station or UE may perform a listen before talk (LBT) procedure to contend for access to the shared radio frequency spectrum. An LBT procedure may include performing a clear channel assessment (CCA) procedure to determine whether a channel of the shared radio frequency spectrum is available. When it is determined that the channel of the shared radio frequency spectrum is available, a channel usage beacon signal (CUBS) may be transmitted to reserve the channel. When a potential transmitter on the first channel receives the CUBS and determines that an energy of the CUBS satisfies a threshold, the potential transmitter may refrain from transmitting on the first channel for a period of time. However, other potential transmitters on the first channel may determine that the energy of the CUBS does not satisfy a threshold, or may not receive the CUBS. These other potential transmitters may thus use the channel, or one or more interfering channels (e.g., an overlapping or adjacent channel), in a manner that interferes with the base station's or UE's reservation and use of the channel.

SUMMARY

The present disclosure, for example, relates to one or more techniques for reserving a channel of a radio frequency spectrum. In some scenarios, the transmission of a CUBS may be sufficient for a first node (e.g., a base station or UE) to reserve a channel of a shared radio frequency spectrum. For example, all of the nodes within range of the first node, which nodes may potentially transmit over the channel of the shared radio frequency spectrum, may detect the energy of the CUBS and refrain from transmitting over the channel for a period of time. However, in other scenarios, one or more nodes within range of the first node may not detect the energy of the CUBS, or one or more nodes may determine that the energy of the CUBS does not satisfy a threshold. These nodes may transmit signals that interfere with signals transmitted or received by the first node.

In some examples, a node's energy detection circuit may be less sensitive than a node's signal reception and decoding circuit. For example, an energy detection circuit of a Wi-Fi node may be less sensitive than a signal reception and decoding circuit used for detecting Wi-Fi transmissions (e.g., Wi-Fi preambles or Wi-Fi packets (e.g., Clear-to-Send (CTS)-to-Self packets, etc.)). Techniques are therefore described for a first node operating according to a first radio access technology to transmit a channel reservation indication understood by a second node operating according to a second radio access technology. A channel reservation indication transmitted in this manner may be detected by the second node in scenarios in which the energy of a CUBS may not be detectable. Also described are techniques for transmitting a channel reservation indication on a channel other than a channel that the first node intends to reserve. This may enable the second node to receive and decode the channel reservation indication when the second node is monitoring a channel other than the channel that the first node intends to reserve, but nonetheless has the potential to transmit on the channel that the first node intends to reserve (or on one or more interfering channels (e.g., one or more overlapping or adjacent channels)).

In a first set of illustrative examples, a method of wireless communication is described. In one configuration, the method may include contending for access to a first channel of a radio frequency spectrum, and transmitting, upon winning contention for access to the first channel, a first channel reservation indication. The contending may be performed by a first node operating according to a first radio access technology. The first channel reservation indication may be understood by a second node operating according to a second radio access technology.

In some examples of the method, transmitting the first channel reservation indication may include transmitting the first channel reservation indication on at least the first channel of the radio frequency spectrum. In some examples of the method, transmitting the first channel reservation indication may include transmitting the first channel reservation indication on at least a second channel of the radio frequency spectrum. In some examples of the method, transmitting the first channel reservation indication on at least the second channel may include transmitting the first channel reservation indication on a plurality of channels.

In some examples, the method may include identifying a primary channel used by the second node, and transmitting the first channel reservation indication may include transmitting the first channel reservation indication on the primary channel used by the second node. In some examples of the method, transmitting the first channel reservation indication may include transmitting the first channel reservation indication on at least one channel of the radio frequency spectrum. The first channel reservation indication transmitted on the one channel of the radio frequency spectrum may indicate at least one other channel occupied by the first radio access technology.

In some examples, the method may include instructing a third node to transmit the first channel reservation indication. In some examples, the third node may be instructed to transmit the first channel reservation indication over at least one of: the first channel or the second channel. In some examples, the first node may include a base station and the third node may include a UE. In some examples, instructing the third node to transmit the first channel reservation indication may include providing an indication to the UE in at least one of: an uplink grant or a radio resource control (RRC) signaling message.

In some examples of the method, the first channel reservation indication may include a Wi-Fi preamble or Wi-Fi packet. In some examples, the method may include including in the Wi-Fi preamble an indication that the first node is using the first channel. In some examples, the method may include including in the Wi-Fi preamble an indication that the first node is using the first channel according to the first radio access technology.

In some examples, the method may include delaying a transmission from the first node to the third node, on the first channel, for a period of time following transmission of the first channel reservation indication, the period of time allowing the second node to react to the first channel reservation indication. In some examples of the method, the first channel reservation indication may be understood by the second node to reserve at least the first channel for a period of time, and the method may further include transmitting a second channel reservation indication, separated in time from the first channel reservation indication, to extend a reservation of the first channel by the first node.

In some examples, the method may include selecting the first channel reservation indication from among a plurality of predetermined channel reservation indications. In some such examples, the selecting may be based at least in part on a relative timing of a subframe boundary or symbol period boundary with respect to winning contention for access to the first channel. In other such examples, the selecting may be based at least in part on an intended channel occupancy after winning contention for access to the first channel.

In some examples, the method may include transmitting, upon winning contention for access to the first channel, at least one of a CUBS or a fractional CUBS (F-CUBS), and transmitting the first channel reservation indication may occur during one of: before transmitting the CUBS; after transmitting the CUBS; before transmitting the F-CUBS and the CUBS; after transmitting the F-CUBS and before transmitting the CUBS; or after transmitting the F-CUBS and the CUBS. In some examples, the method may include selecting a time for transmitting the first channel reservation indication with reference to transmitting the F-CUBS or the CUBS. The time may be selected based at least in part on a relative timing of a subframe boundary or symbol period boundary with respect to winning contention for access to the first channel.

In a second set of illustrative examples, another apparatus for wireless communication is described. In one configuration, the apparatus may include a processor, memory in electronic communication with the processor, and instructions stored in the memory. The instructions may be executable by the processor to contend for access to a first channel of a radio frequency spectrum, and to transmit, upon winning contention for access to the first channel, a first channel reservation indication. The contending may be performed by a first node operating according to a first radio access technology. The first channel reservation indication may be understood by a second node operating according to a second radio access technology.

In some examples, the instructions executable by the processor to transmit the first channel reservation indication may also be executable to transmit the first channel reservation indication on at least the first channel of the radio frequency spectrum. In some examples, the instructions executable by the processor to transmit the first channel reservation indication may also be executable to transmit a second channel of the radio frequency spectrum. In some examples, the second channel may be at least one of: adjacent to the first channel, within a same radio frequency spectrum band as the first channel, or within a same radio frequency spectrum sub-band as the first channel.

In some examples, the instructions may be executable by the processor to identify a primary channel used by the second node and transmit the first channel reservation indication on the primary channel used by the second node. In some examples, the instructions executable by the processor to transmit the first channel reservation indication may include instructions executable by the processor to transmit the first channel reservation indication on at least one channel of the radio frequency spectrum. The first channel reservation indication transmitted on the one channel of the radio frequency spectrum may indicate at least one other channel occupied by the first radio access technology.

In some examples of the apparatus, the instructions may be executable by the processor to select the first channel reservation indication from among a plurality of predetermined channel reservation indications. In some such examples, the selecting may be based at least in part on a relative timing of a subframe boundary or symbol period boundary with respect to winning contention for access to the first channel. In other such examples, the selecting may be based at least in part on an intended channel occupancy after winning contention for access to the first channel. In some examples, the instructions may also be executable by the processor to implement one or more aspects of the method for wireless communication described above with respect to the first set of illustrative examples.

In a third set of illustrative examples, another apparatus for wireless communication is described. In one configuration, the apparatus may include means for contending for access to a first channel of a radio frequency spectrum, and means for transmitting, upon winning contention for access to the first channel, a first channel reservation indication. The contending may be performed by a first node operating according to a first radio access technology. The first channel reservation indication may be understood by a second node operating according to a second radio access technology.

Some examples of the apparatus may include a means for identifying a primary channel used by the second node. In some examples, the means for transmitting the first channel reservation indication may include a means for transmitting the first channel reservation indication on the primary channel used by the second node. In some examples, the means for transmitting the first channel reservation indication may include a means for transmitting the first channel reservation indication on at least one channel of the radio frequency spectrum. The first channel reservation indication transmitted on the one channel of the radio frequency spectrum may indicate at least one other channel occupied by the first radio access technology.

Some examples of the apparatus may include a means for delaying a transmission from the first node to a third node, on the first channel, for a period of time following transmission of the first channel reservation indication, the period of time allowing the second node to react to the first channel reservation indication. In some examples of the apparatus, the first channel reservation indication may be understood by the second node to reserve at least the first channel for a period of time, and the apparatus may further include transmitting a second channel reservation indication, separated in time from the first channel reservation indication, to extend a reservation of the first channel by the first node.

Some examples of the apparatus may include a means for selecting the first channel reservation indication from among a plurality of predetermined channel reservation indications, the selecting based at least in part on either a relative timing of a subframe boundary or symbol period boundary with respect to winning contention for access to the first channel. In other such examples, the selecting may be based at least in part on an intended channel occupancy after winning contention for access to the first channel.

In some examples of the apparatus, upon winning contention for access to the first channel, at least one of a channel usage beacon signal (CUBS) or a fractional CUBS (F-CUBS), the means for transmitting the first channel reservation indication may occur during one of: before transmitting the CUBS; after transmitting the CUBS; before transmitting the F-CUBS and the CUBS; after transmitting the F-CUBS and before transmitting the CUBS; or after transmitting the F-CUBS and the CUBS. Some examples of the apparatus may include a means for selecting a time for transmitting the first channel reservation indication with reference to transmitting the F-CUBS or the CUBS, the time selected based at least in part on a relative timing of a subframe boundary or symbol period boundary with respect to winning contention for access to the first channel. In some examples, the apparatus may further include means for implementing one or more aspects of the method for wireless communication described above with respect to the first set of illustrative examples.

In a fourth set of illustrative examples, a non-transitory computer-readable medium for storing instructions executable by a processor is described. In one configuration, the non-transitory computer-readable medium may include instructions to contend for access to a first channel of a radio frequency spectrum, and instructions to transmit, upon winning contention for access to the first channel, a first channel reservation indication. The contending may be performed by a first node operating according to a first radio access technology. The first channel reservation indication may be understood by a second node operating according to a second radio access technology. In some examples of the non-transitory computer-readable medium, the instructions to transmit the first channel reservation indication may include instructions to transmit the first channel reservation indication on at least the first channel of the radio frequency spectrum. In some examples of the non-transitory computer-readable medium, the instructions to transmit the first channel reservation indication may include instructions to transmit the first channel reservation indication on a second channel of the radio frequency spectrum. In some examples, the non-transitory computer-readable medium may also include instructions to implement one or more aspects of the method for wireless communication described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
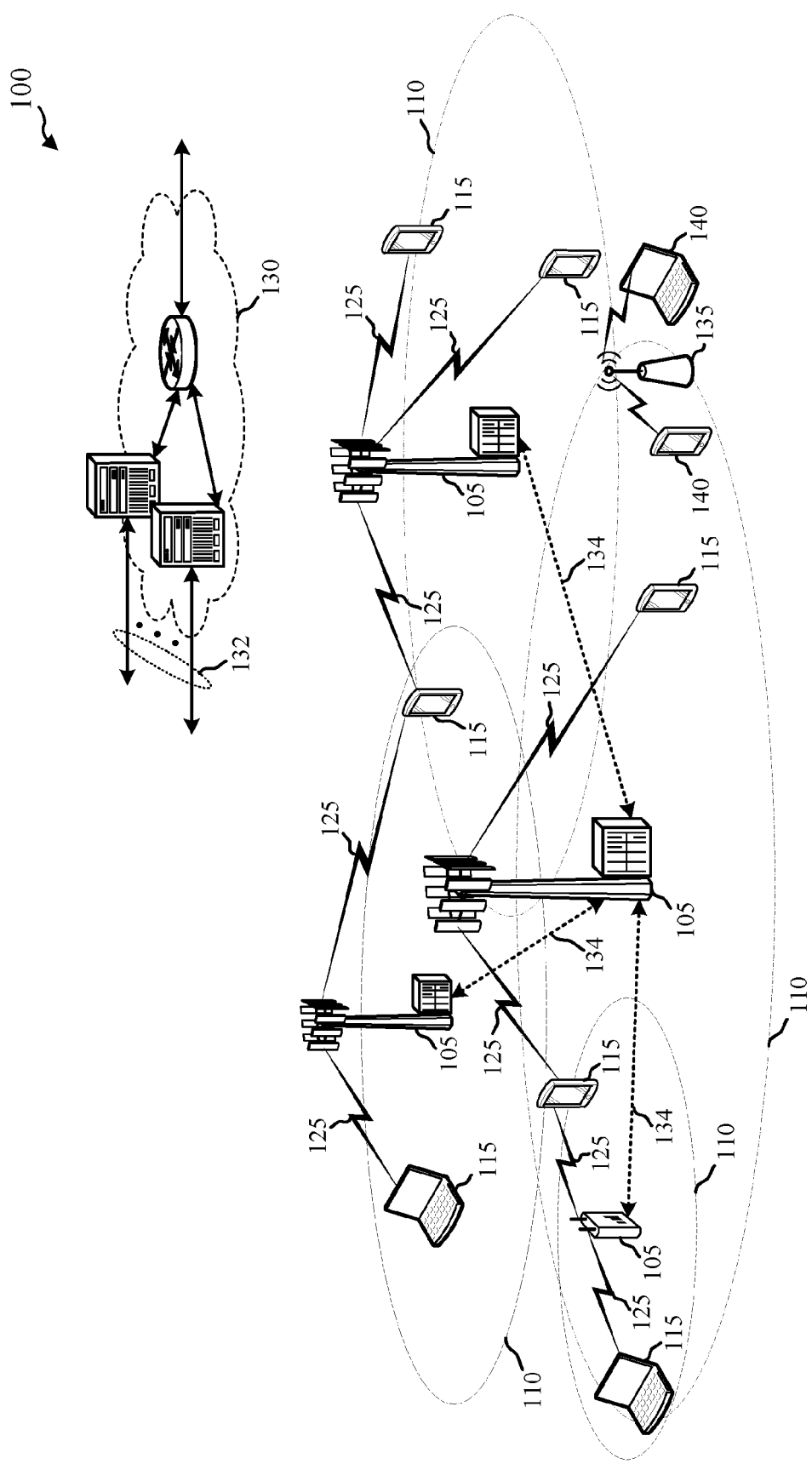
FIG. 1 illustrates an example of a wireless communication system, in accordance with various aspects of the disclosure.

Techniques are described in which a shared radio frequency spectrum is used for at least a portion of communications over a wireless communication system. In some examples, the shared radio frequency spectrum may be used for LTE/LTE-A communications. The shared radio frequency spectrum may be used in combination with, or independent from, a dedicated radio frequency spectrum. The dedicated radio frequency spectrum may be a radio frequency spectrum for which transmitting apparatuses may not contend for access because the radio frequency spectrum is licensed to particular users, such as a licensed radio frequency spectrum usable for LTE/LTE-A communications. The shared radio frequency spectrum may be a radio frequency spectrum for which a device may need to contend for access (e.g., a radio frequency spectrum that is available for unlicensed use, such as Wi-Fi use, or a radio frequency spectrum that is available for use by multiple operators in an equally shared or prioritized manner).

With increasing data traffic in cellular networks that use a dedicated radio frequency spectrum, offloading of at least some data traffic to a shared radio frequency spectrum may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum may also provide service in areas where access to a dedicated radio frequency spectrum is unavailable. As noted above, before communicating over a shared radio frequency spectrum, transmitting apparatuses may perform an LBT procedure to gain access to the medium. Such an LBT procedure may include performing a CCA procedure (or extended CCA procedure) to determine whether a channel of the shared radio frequency spectrum is available. When it is determined that the channel of the shared radio frequency spectrum is available, a CUBS may be transmitted to reserve the channel. A channel reservation indication may also be transmitted over the radio frequency spectrum (e.g., on the channel being reserved or on one or more other channels (e.g., one or more overlapping or adjacent channels, or one or more channels in a same radio frequency spectrum band or same radio frequency spectrum sub-band, which channel may be used by a another transmitting device (e.g., a Wi-Fi node) that may also use a channel that overlaps or is adjacent to the channel being reserved)). The channel reservation indication may be decodable by nodes operating according to a different radio access technology, and for these nodes, may reserve the channel more effectively than the CUBS. The channel reservation indication may also be transmitted on a channel or channels that the nodes operating according to the different radio access technology are more likely to monitor. When it is determined that a channel is not available, a CCA procedure (or extended CCA procedure) may be performed for the channel again at a later time, and the CUBS and channel reservation indication need not be transmitted.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrums as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or second type of operation. For synchronous operation, the base stations may have similar frame timing, and transmissions from different base stations may be approximately aligned in time. For second type of operation, the base stations may have different frame timing, and transmissions from different base stations may not be aligned in time. The techniques described herein may be used for either synchronous or second type of operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described herein. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, the wireless communication system 100 may support operation over a dedicated radio frequency spectrum (e.g., a radio frequency spectrum for which transmitting apparatuses may not contend for access because the radio frequency spectrum is licensed to particular users for particular uses, such as a licensed radio frequency spectrum usable for LTE/LTE-A communications) or a shared radio frequency spectrum (e.g., a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner)).

In some examples, the wireless communication system 100 may operate according to a first radio access technology (e.g., a cellular radio access technology, such as an LTE/LTE-A technology), but operate in the presence of one or more networks or nodes operating according to a second radio access technology (e.g., a Wi-Fi technology). By way of example, FIG. 1 shows a network comprised of a Wi-Fi access point 135 in communication with Wi-Fi stations 140. In some examples, various of the UEs 115 may sometimes operate according to a Wi-Fi technology, and various of the Wi-Fi stations 140 may sometimes operate according to a cellular radio access technology.

Upon winning contention for access to the shared radio frequency spectrum, a transmitting apparatus of the wireless communication system 100 (e.g., a base station 105 or UE 115) may transmit one or more CUBS over the shared radio frequency spectrum. The CUBS may reserve the shared radio frequency spectrum by providing a detectable energy on the shared radio frequency spectrum. For a receiving apparatus that is capable of decoding the CUBS, the CUBS may also serve to identify the transmitting apparatus or serve to synchronize the receiving apparatus with the transmitting apparatus.

Upon winning contention for access to the shared radio frequency spectrum, a transmitting apparatus of the wireless communication system 100 (e.g., a base station 105 or UE 115) may also transmit a channel reservation indication. In some examples, the channel reservation indication may be transmitted over the channel being reserved. The channel reservation indication may also or alternatively be transmitted over a channel other than the channel being reserved (e.g., over one or more overlapping or adjacent channels, or one or more channels in a same radio frequency spectrum band or same radio frequency spectrum sub-band, which channel may be used by a another transmitting device that may also use a channel that overlaps or is adjacent to the channel being reserved).

Each of the Wi-Fi nodes operating near or within the coverage area of the wireless communication system 100 (e.g., the Wi-Fi access points 135 and the Wi-Fi stations 140) may operate on a primary channel and one or more secondary channels. Wi-Fi nodes perform a hierarchical CCA procedure, in which a Carrier Sense Multiple Access (CSMA) procedure is performed on the Wi-Fi node's primary channel, and a less sensitive energy detection procedure is performed on each secondary channel. The CSMA procedure may include a reception and decoding of Wi-Fi preambles or Wi-Fi packets, whereas the energy detection procedure may only detect signal energy and may not involve signal decoding. When a channel reservation indication is transmitted on the primary channel of a Wi-Fi node, the chance of the channel reservation indication being detected is increased, and there is a chance that the channel reservation indication may be decoded. When the primary channel(s) of Wi-Fi nodes operating in the vicinity of a base station 105 or UE 115 are known, a base station 105 or UE 115 attempting to reserve a channel of the shared radio frequency spectrum may transmit a channel reservation indication on each such primary channel that overlaps or is adjacent to the channel being reserved by the base station 105 or UE 115, or on each channel that may be associated with a secondary channel that overlaps or is adjacent to the channel being reserved by the base station 105 or UE 115. When the primary channel(s) of Wi-Fi nodes operating in the vicinity of a base station 105 or UE 115 are not known, the base station 105 or UE 115 may transmit a channel reservation indication over a plurality of overlapping, adjacent, or disjoint channels, each of which has the potential to be used as a primary channel by one or more of the Wi-Fi nodes. In IEEE 802.11n networks, all Wi-Fi networks/nodes are encouraged to use the same primary channel, whereas in IEEE 802.11ac networks, different Wi-Fi networks are encouraged to use different primary channels. A base station 105 or UE 115 reserving a channel of a shared radio frequency spectrum may therefore need to transmit a channel reservation indication over more channels to mitigate interference from Wi-Fi nodes operating in an IEEE 802.11ac network.

Figure 2:
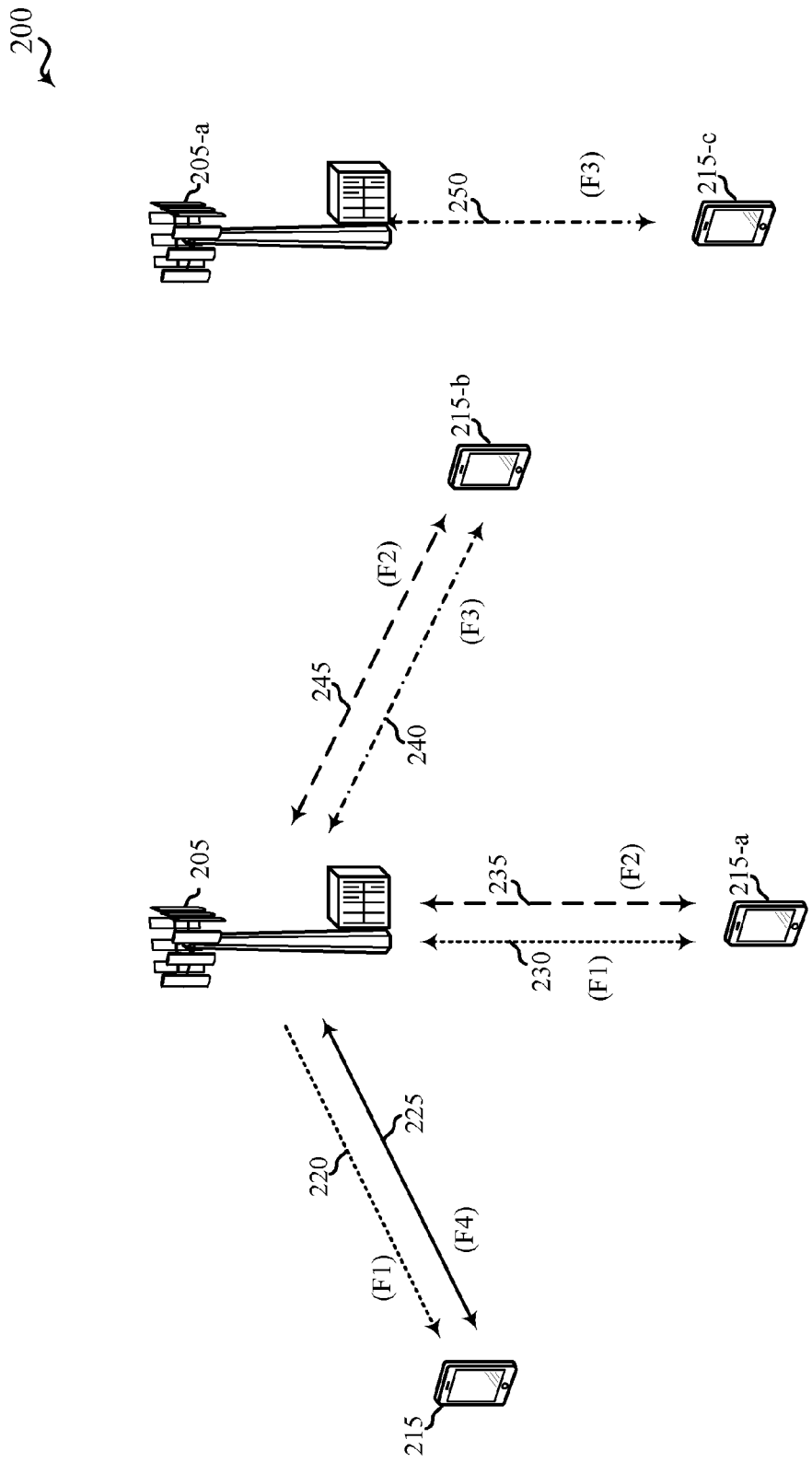
FIG. 2 shows a wireless communication system in which LTE/LTE-A may be deployed under different scenarios using a shared radio frequency spectrum, in accordance with various aspects of the present disclosure.

FIG. 2 shows a wireless communication system 200 in which LTE/LTE-A may be deployed under different scenarios using a shared radio frequency spectrum, in accordance with various aspects of the present disclosure. More specifically, FIG. 2 illustrates examples of a supplemental downlink mode (also referred to as a licensed assisted access mode), a carrier aggregation mode, and a standalone mode in which LTE/LTE-A is deployed using a shared radio frequency spectrum. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode (e.g., a licensed assisted access mode) in the wireless communication system 200, the first base station 205 may transmit OFDMA waveforms to the first UE 215 using a downlink channel 220. The downlink channel 220 may be associated with a frequency F1 in a shared radio frequency spectrum. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum. The downlink channel 220 in the shared radio frequency spectrum and the first bidirectional link 225 in the dedicated radio frequency spectrum may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a dedicated radio frequency spectrum and needs to relieve some of the traffic or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the shared radio frequency spectrum. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a dedicated radio frequency spectrum. The second bidirectional link 230 may provide a downlink and uplink capacity offload for the first base station 205. Like the supplemental downlink (e.g., the licensed assisted access mode) described above, this scenario may occur with any service provider (e.g., MNO) that uses a dedicated radio frequency spectrum and needs to relieve some of the traffic or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, or resource block interleaved waveforms from the third UE 215-b using the fourth bidirectional link 240. The fourth bidirectional link 240 may be associated with a frequency F3 in the shared radio frequency spectrum. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the dedicated radio frequency spectrum. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a dedicated radio frequency spectrum and use a shared radio frequency spectrum for capacity offload.

As described above, one type of service provider that may benefit from the capacity offload offered by using LTE/LTE-A in a shared radio frequency spectrum is a traditional MNO having access rights to an LTE/LTE-A dedicated radio frequency spectrum. For these service providers, an operational example may include a bootstrapped mode (e.g., supplemental downlink (e.g., licensed assisted access), carrier aggregation) that uses the LTE/LTE-A primary component carrier (PCC) on the dedicated radio frequency spectrum and at least one secondary component carrier (SCC) on the shared radio frequency spectrum.

In the carrier aggregation mode, data and control may, for example, be communicated in the dedicated radio frequency spectrum (e.g., via first bidirectional link 225, third bidirectional link 235, and fifth bidirectional link 245) while data may, for example, be communicated in the shared radio frequency spectrum (e.g., via second bidirectional link 230 and fourth bidirectional link 240). The carrier aggregation mechanisms supported when using a shared radio frequency spectrum may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, or resource block interleaved FDMA waveforms from the fourth UE 215-c using the bidirectional link 250. The bidirectional link 250 may be associated with the frequency F3 in the shared radio frequency spectrum. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum.

In some examples, a transmitting apparatus such as one of the base stations 105, 205, or 205-a described with reference to FIG. 1 or 2, or one of the UEs 115, 215, 215-a, 215-b, or 215-c described with reference to FIG. 1 or 2, may use a gating interval to gain access to a channel of a shared radio frequency spectrum (e.g., to a physical channel of the shared radio frequency spectrum). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a shared radio frequency spectrum is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
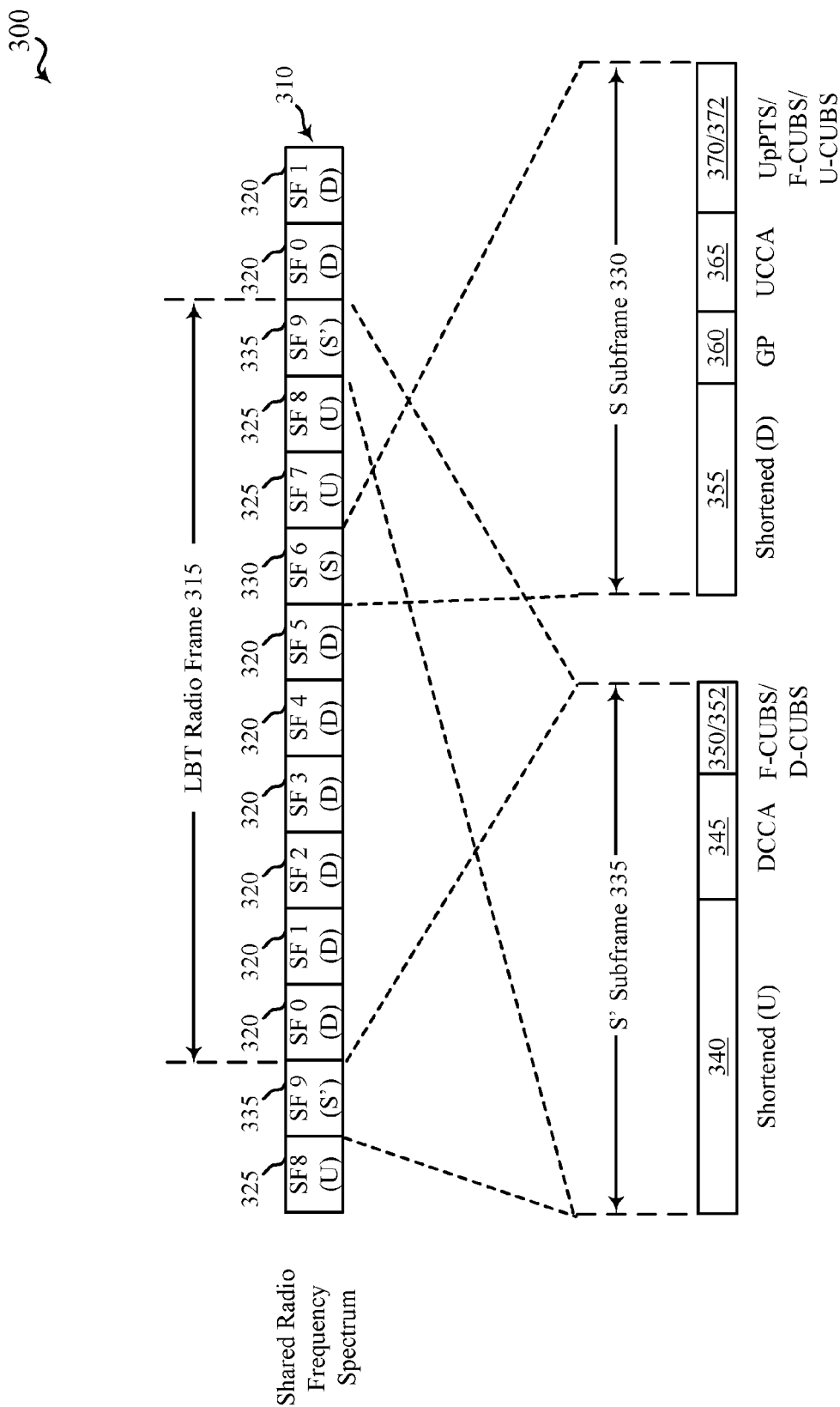
FIG. 3 shows an example of a wireless communication over a shared radio frequency spectrum, in accordance with various aspects of the present disclosure.

FIG. 3 shows an example 300 of a wireless communication 310 over a shared radio frequency spectrum, in accordance with various aspects of the present disclosure. In some examples, the shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner).

In some examples, an LBT radio frame 315 of the wireless communication 310 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (DCCA) procedure 345 may be performed by one or more base stations, such as one or more of the base stations 105, 205, or 205-a described with reference to FIG. 1 or 2, to reserve, for a period of time, a channel of the shared radio frequency spectrum over which the wireless communication 310 occurs. Following a successful DCCA procedure 345 by a base station, the base station may transmit a channel usage beacon signal (CUBS) (e.g., a fractional CUBS (F-CUBS 350) transmitted until a next symbol period boundary and/or a downlink CUBS (D-CUBS 352) transmitted until a next subframe boundary) to provide an indication to other base stations or apparatuses (e.g., UEs, Wi-Fi access points, etc.) that the base station has reserved the channel. In some examples, an F-CUBS 350 or a D-CUBS 352 may be transmitted using a plurality of interleaved resource blocks. Transmitting an F-CUBS 350 or a D-CUBS 352 in this manner may enable the F-CUBS 350 or D-CUBS 352 to occupy at least a certain percentage of the available frequency bandwidth of the shared radio frequency spectrum and satisfy one or more regulatory requirements (e.g., a requirement that transmissions over the shared radio frequency spectrum occupy at least 80% of the available frequency bandwidth). The F-CUBS 350 or D-CUBS 352 may in some examples take a form similar to that of an LTE/LTE-A cell-specific reference signal (CRS) or a channel state information reference signal (CSI-RS). When the DCCA procedure 345 fails, the F-CUBS 350 or D-CUBS 352 may not be transmitted.

The S' subframe 335 may include a plurality of OFDM symbol periods (e.g., 14 OFDM symbol periods). A first portion of the S' subframe 335 may be used by a number of UEs as a shortened uplink (U) period 340. A second portion of the S' subframe 335 may be used for the DCCA procedure 345. A third portion of the S' subframe 335 may be used by one or more base stations that successfully contend for access to the channel of the shared radio frequency spectrum to transmit the F-CUBS 350 or D-CUBS 352.

During the S subframe 330, an uplink CCA (UCCA) procedure 365 may be performed by one or more UEs, such as one or more of the UEs 115, 215, 215-*a*, 215-*b*, or 215-*c* described above with reference to FIG. 1 or 2, to reserve, for a period of time, the channel over which the wireless communication 310 occurs. Following a successful UCCA procedure 365 by a UE, the UE may transmit an F-CUBS 370 or uplink CUBS (U-CUBS 372) to provide an indication to other UEs or apparatuses (e.g., base stations, Wi-Fi access points, etc.) that the UE has reserved the channel. In some examples, an F-CUBS 370 or U-CUBS 372 may be transmitted using a plurality of interleaved resource blocks. Transmitting an F-CUBS 370 or U-CUBS 372 in this manner may enable the F-CUBS 370 or U-CUBS 372 to occupy at least a certain percentage of the available frequency bandwidth of the shared radio frequency spectrum and satisfy one or more regulatory requirements (e.g., the requirement that transmissions over the shared radio frequency spectrum occupy at least 80% of the available frequency bandwidth). The F-CUBS 370 or U-CUBS 372 may in some examples take a form similar to that of an LTE/LTE-A CRS or CSI-RS. When the UCCA procedure 365 fails, the F-CUBS 370 or U-CUBS 372 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the UCCA procedure 365. A fourth portion of the S subframe 330 may be used by one or more UEs that successfully contend for access to the channel of the shared radio frequency spectrum as an uplink pilot time slot (UpPTS) or to transmit the F-CUBS 370 or U-CUB S 372.

In some examples, the DCCA procedure 345 or the UCCA procedure 365 may include the performance of a single CCA procedure. In other examples, the DCCA procedure 345 or the UCCA procedure 365 may include the performance of an extended CCA procedure. The extended CCA procedure may include a random number of CCA procedures, and in some examples may include a plurality of CCA procedures. The terms DCCA procedure and UCCA procedure are therefore intended to be broad enough to cover the performance of either a single CCA procedure or an extended CCA procedure. The selection of a single CCA procedure or an extended CCA procedure, for performance by a base station or a UE during an LBT radio frame, may be based on LBT rules. In some cases, the term CCA procedure may be used in this disclosure, in a general sense, to refer to either a single CCA procedure or an extended CCA procedure.

By way of example, the LBT radio frame 315 has a DDDDDDSUUS' TDD frame structure. In other examples, an LBT radio frame may have a different TDD frame structure.

Figure 4:
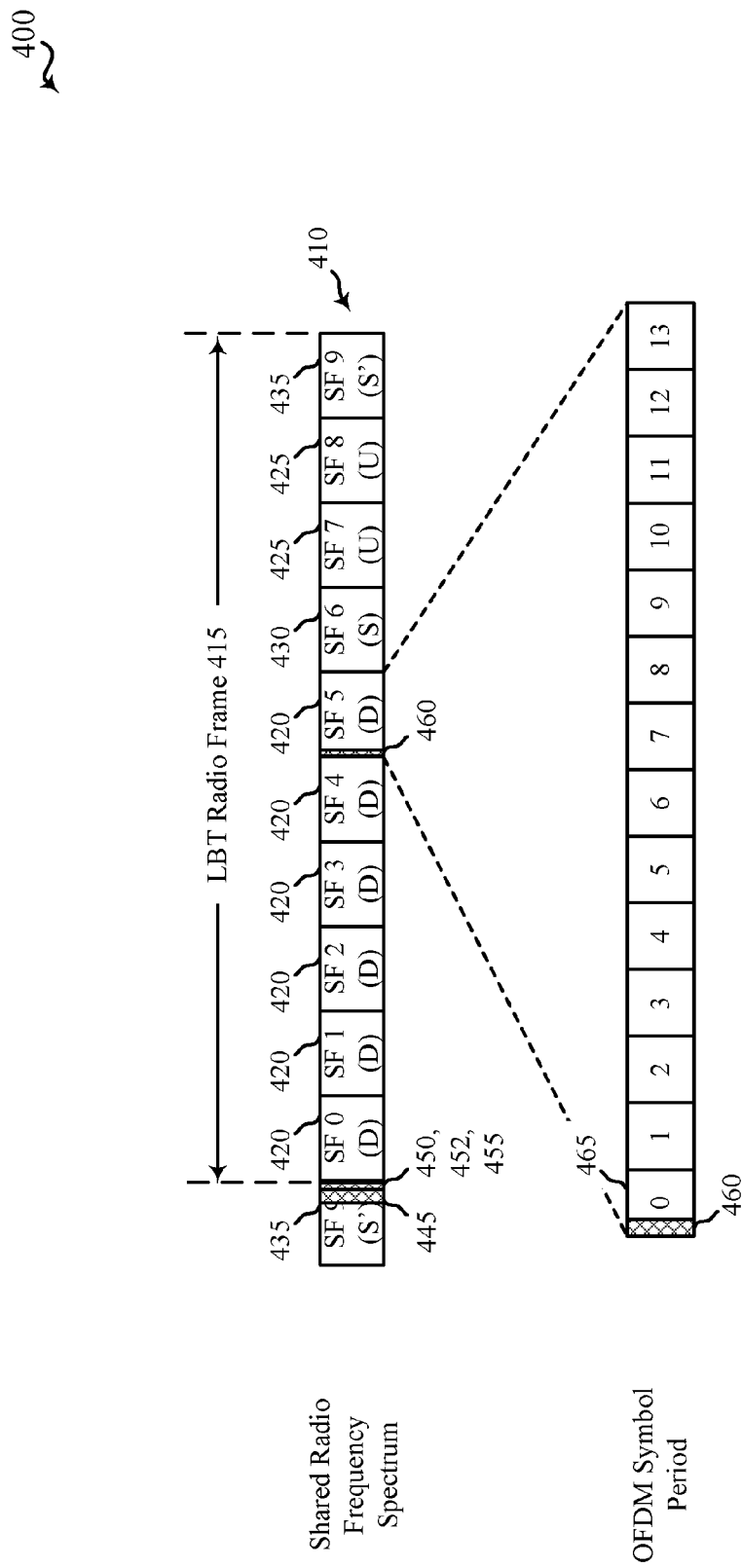
FIG. 4 shows an example of a wireless communication over a shared radio frequency spectrum, in accordance with various aspects of the present disclosure.

FIG. 4 shows an example 400 of a wireless communication 410 over a shared radio frequency spectrum, in accordance with various aspects of the present disclosure. In some examples, the shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner).

In some examples, an LBT radio frame 415 of the wireless communication 410 may have a duration of ten milliseconds and include a number of downlink (D) subframes 420, a number of uplink (U) subframes 425, and two types of special subframes, an S subframe 430 and an S' subframe 435. In some examples, the D subframes 420, U subframes 425, S subframe 430, and S' subframe 435 may be configured similarly to the respective D subframes 320, U subframes 325, S subframe 330, and S' subframe 335 described with reference to FIG. 3. The LBT radio frame 415 may also have a shorter or longer duration, or a different combination of D subframes 420, U subframes 425, S subframes 430, or S' subframes 435. By way of example, the LBT radio frame 415 has a DDDDDDSUUS' TDD frame structure.

During the S' subframe 435, a downlink clear channel assessment (DCCA) procedure 445 may be performed by one or more base stations, such as one or more of the base stations 105, 205, or 205-*a* described with reference to FIG. 1 or 2, to reserve, for a period of time, a channel of the shared radio frequency spectrum (e.g., a first channel) of the wireless communication 410. Following a successful DCCA procedure 445 by a base station, the base station may transmit an F-CUBS 450 and/or CUBS 452 on the first channel, to provide an indication to other potential transmitters on the first channel (e.g., other base stations, or apparatuses such as UEs, Wi-Fi nodes, etc.) that the base station has reserved the first channel. The F-CUBS 450 and/or CUBS 452 may be configured or transmitted as described with reference to the F-CUBS 350 and/or D-CUBS 452 described with reference to FIG. 3.

In some examples, a potential transmitter on the first channel may determine that an energy of the F-CUBS 450 or D-CUBS 452 satisfies a threshold and determine not to transmit on the first channel for a period of time. However, other potential transmitters may determine that the energy of the F-CUBS 450 or D-CUBS 452 does not satisfy a threshold, or may not sense the energy of the F-CUBS 450 or D-CUBS 452. These other potential transmitters may thus use the first channel, or one or more channels that otherwise interfere with the first channel (e.g., a channel that overlaps or is adjacent to the first channel), in a manner that interferes with the base station's reservation and use of the first channel. To mitigate such an interfering use, the base station may transmit a first channel reservation indication 455 upon winning contention for access to the first channel (e.g., following the successful DCCA procedure 445). The first channel reservation indication 455 may be formatted to be understood by a particular radio access technology. In some examples, the particular radio access technology may differ from a radio access technology that the base station intends to use when communicating on the first channel. For example, the base station may intend to operate on the first channel according to an LTE/LTE-A technology, but format the first channel reservation indication 455 to be understood by a node operating according to a Wi-Fi technology.

In some examples, the first channel reservation indication 455 may be transmitted on at least the first channel of the radio frequency spectrum. The first channel reservation indication 455 may also or alternatively be transmitted on at least a second channel of the radio frequency spectrum. In some examples, in response to winning contention for access to the first channel, a listen before talk (LBT) procedure (e.g., a shortened CCA procedure) may be performed for the second channel of the radio frequency spectrum, prior to transmitting the first channel reservation indication on the second channel of the radio frequency spectrum. In some examples, the second channel may be adjacent to the first channel, within a same radio frequency spectrum band as the first channel, or within a same radio frequency spectrum sub-band as the first channel. In some examples, the first channel reservation indication 455 may be transmitted on a plurality of channels adjacent to the first channel, within a same radio frequency spectrum band as the first channel, or within a same radio frequency spectrum sub-band as the first channel.

In some examples, the first channel reservation indication 455 may be transmitted on one channel of the radio frequency spectrum, but indicate at least one other channel the base station intends to occupy. The first channel reservation indication 455 may also or alternatively indicate that the base station intends to occupy the channel on which the first channel reservation indication 455 is transmitted.

In some examples, the first channel reservation indication may include a Wi-Fi preamble or Wi-Fi packet (e.g., a Wi-Fi CTS-to-Self packet). In some examples, the Wi-Fi preamble or Wi-Fi packet may include an indication that the base station is using the first channel, or an indication that the base station is using the first channel according to a radio access technology other than a Wi-Fi technology. In some examples, the first channel reservation indication 455 may also or alternatively include another type of Wi-Fi transmission, such as a Wi-Fi CTS-to-Self packet. In some examples, the first channel reservation indication 455 may include an indication of a time duration for which the first channel (or a group of channels including the first channel) is reserved by the first node.

In some examples, a time duration indicated in (or implied by) the first channel reservation indication 455 may be shorter than the duration that the base station (or the UEs that the base station serves) intends to occupy the first channel. For example, the IEEE 802.11 standards currently limit the duration of a channel reservation specified in a Wi-Fi preamble to 5.46 milliseconds. A base station that intends to reserve the first channel in the presence of Wi-Fi nodes, for a duration exceeding five subframes, may therefore transmit a second channel reservation indication 460 (e.g., a second Wi-Fi preamble or Wi-Fi packet). The second channel reservation indication 460 may be separated in time from the first channel reservation indication 455, and may extend a reservation of the first channel by the base station. The second channel reservation indication 460 may be transmitted over the same channel(s) as the first channel reservation indication 455, or over one or more different channels. In some examples, the second channel reservation indication 460 may be transmitted during (or multiplexed within) a data transmission by the base station. For example, the second channel reservation indication 460 may puncture a first symbol period of a subframe of a data transmission (e.g., the first OFDM symbol period 465 of D subframe 420 (SF 5)). If the punctured symbol period is in a predetermined location known to base stations and UEs, the UEs can rate match around the punctured symbol period without the base station indicating that the symbol period has been punctured.

Figure 5:
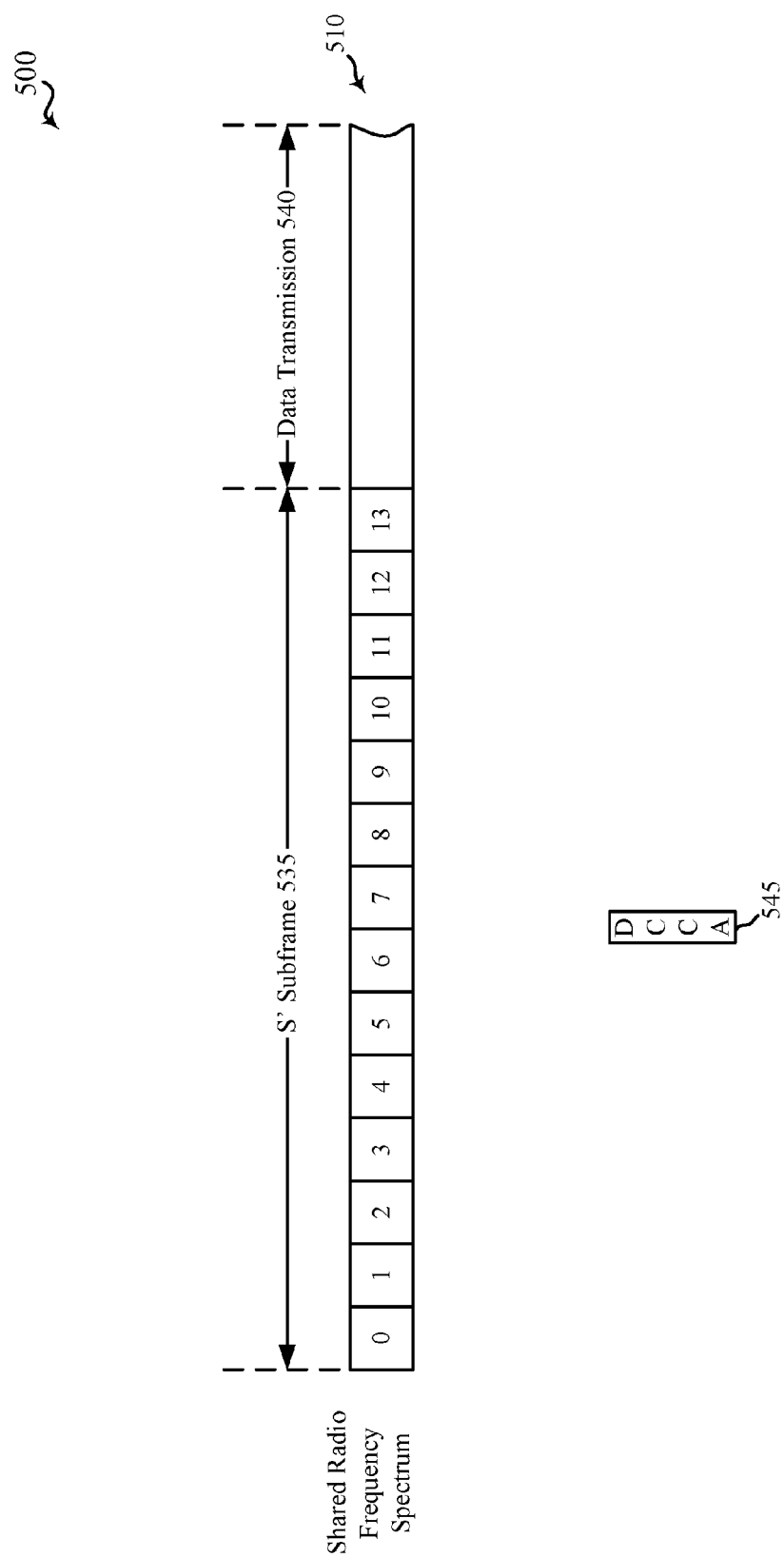
FIG. 5 shows an example of a wireless communication over a shared radio frequency spectrum, in accordance with various aspects of the present disclosure.

FIG. 5 shows an example 500 of a wireless communication 510 over a shared radio frequency spectrum, in accordance with various aspects of the present disclosure. In some examples, the shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner).

By way of example, the wireless communication 510 is shown to include an S' subframe 535 followed by a data transmission 540. The S' subframe 535 may be an example of the S' subframe 335 or 435 described with reference to FIG. 3 or 4, and the data transmission 540 may be an example of the D subframes 320 or 420 described with reference to FIG. 3 or 4. A DCCA procedure 545 may be performed during, or over, one or more symbol periods of the S' subframe 535 (e.g., during, or over, one or more of the OFDM symbol periods numbered 0 to 13). In some examples, the symbol period in which the DCCA procedure 545 is performed or begun may vary from one LBT radio frame to the next, and thus, the relative timing of a subframe boundary (e.g., a next subframe boundary) or a symbol period boundary (e.g., a next symbol period boundary) with respect to winning contention for access to a channel of the shared radio frequency spectrum may vary. In some examples (e.g., in the case of performing an extended CCA procedure), the duration of the DCCA procedure 545 may vary, and thus, the relative timing of a subframe boundary (e.g., a next subframe boundary) or a symbol period boundary (e.g., a next symbol period boundary) with respect to winning contention for access to a channel of the shared radio frequency spectrum may vary.

In some examples, a base station that wins contention for access to a first channel of the shared radio frequency spectrum, during the S' subframe 535, may select a channel reservation indication from among a plurality of predetermined channel reservation indications, and transmit the selected channel reservation indication on at least the first channel or a second channel, as described with reference to FIG. 4. In some examples, the selecting may be based at least in part on a relative timing of a subframe boundary or symbol period boundary with respect to winning contention for access to the first channel. In some examples, the selecting may be based at least in part on an intended channel occupancy of the base station after winning contention for access to the first channel.

In the case of selecting a channel reservation indication based at least in part on a relative timing of a subframe boundary or symbol period boundary with respect to winning contention for access to the first channel, the plurality of predetermined channel reservation indications may include Wi-Fi preambles having L-SIG fields configured with different values, which different values cause Wi-Fi nodes to refrain from transmitting on the first channel for different time periods. A Wi-Fi preamble having an appropriate L-SIG value may therefore be selected based on the timing of winning contention for access to the shared radio frequency spectrum. A Wi-Fi preamble having an appropriate L-SIG value could also or alternatively be selected based on a duration for which the base station intends to reserve the first channel, so that the base station does not reserve the first channel for longer than it is needed.

Figure 6:
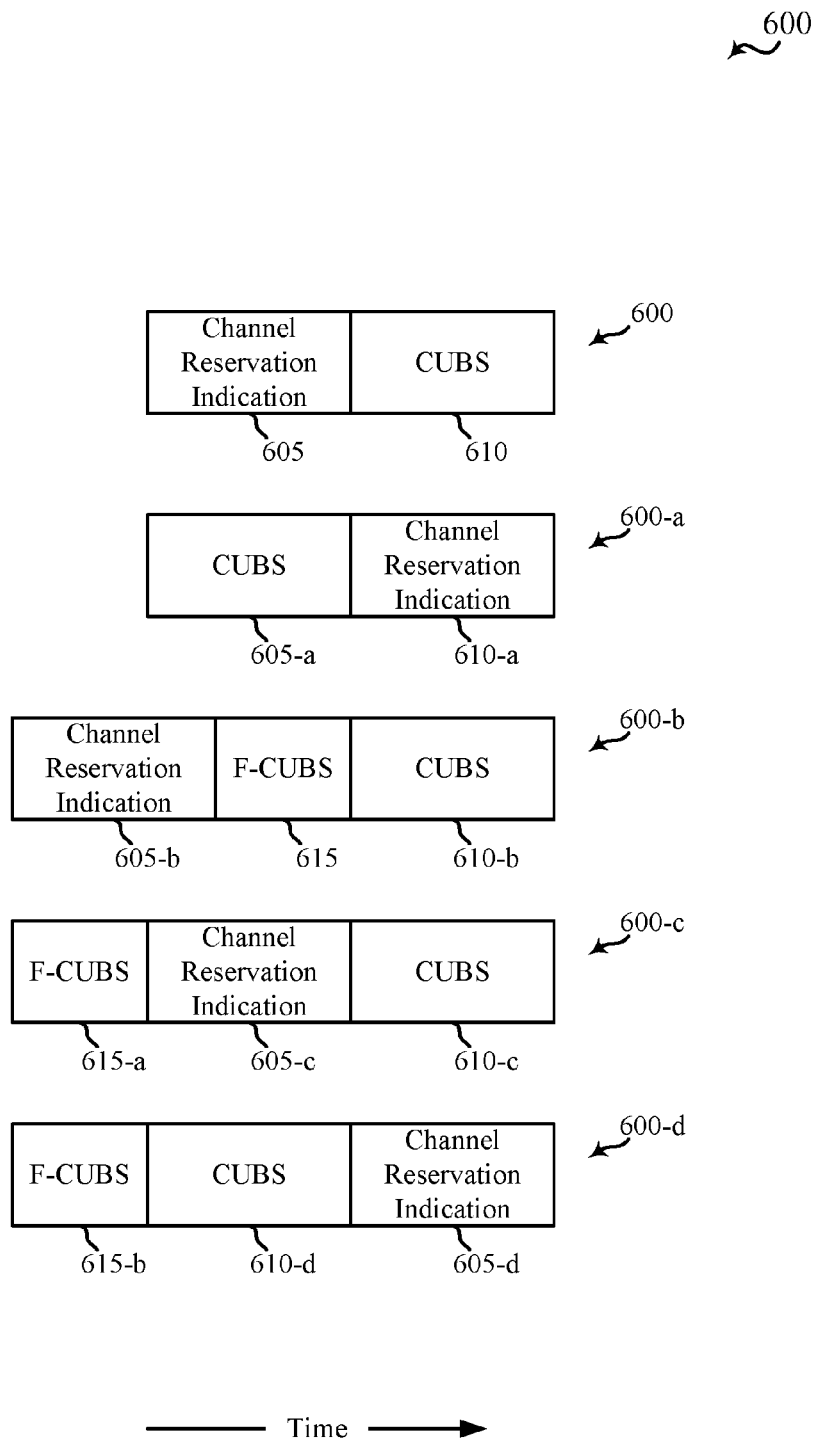
FIG. 6 shows various examples of transmitting a channel reservation indication over a shared radio frequency spectrum, in accordance with various aspects of the present disclosure.

FIG. 6 shows various examples of transmitting a channel reservation indication over a shared radio frequency spectrum, in accordance with various aspects of the present disclosure. In some examples, the shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). In some examples, the channel reservation indication may be one of the channel reservation indications described with reference to FIG. 4 or 5.

In a first example 600 of transmitting a channel reservation indication over a shared radio frequency spectrum, the channel reservation indication 605 may be transmitted before transmitting a CUBS 610. In a second example 600-*a* of transmitting a channel reservation indication over a shared radio frequency spectrum, the channel reservation indication 610-*a* may be transmitted after transmitting a CUBS 605-*a*. In a third example 600-*b* of transmitting a channel reservation indication over a shared radio frequency spectrum, the channel reservation indication 605-*b* may be transmitted before transmitting an F-CUBS 615 and a CUBS 610-*b*. In a fourth example 600-*c* of transmitting a channel reservation indication over a shared radio frequency spectrum, the channel reservation indication 605-*c* may be transmitted after transmitting an F-CUBS 615-*a* and before transmitting a CUBS 610-*c*. In a fifth example 600-*d* of transmitting a channel reservation indication over a shared radio frequency spectrum, the channel reservation indication 605-*d* may be transmitted after transmitting an F-CUBS 615-*b* and a CUBS 610-*d*. Transmitting a channel reservation indicator early may best reduce the likelihood of another transmitter transmitting over the channel being reserved, while transmitting a channel reservation indicator later may enable the channel to be reserved for a longer data transmission. However, the timing of transmitting a channel reservation indicator may also be selected based on additional or alternate considerations.

In some examples, a base station may be statically or semi-statically programmed with a predetermined timing for transmitting a channel reservation indication. In other examples, a base station may dynamically select a time for transmitting a channel reservation indication with reference to transmitting an F-CUBS or CUBS. In some examples, the time for transmitting the channel reservation indication may be selected based at least in part on a relative timing of a subframe boundary or a symbol boundary with respect to winning contention for access to a channel of the shared radio frequency spectrum.

Figure 7:
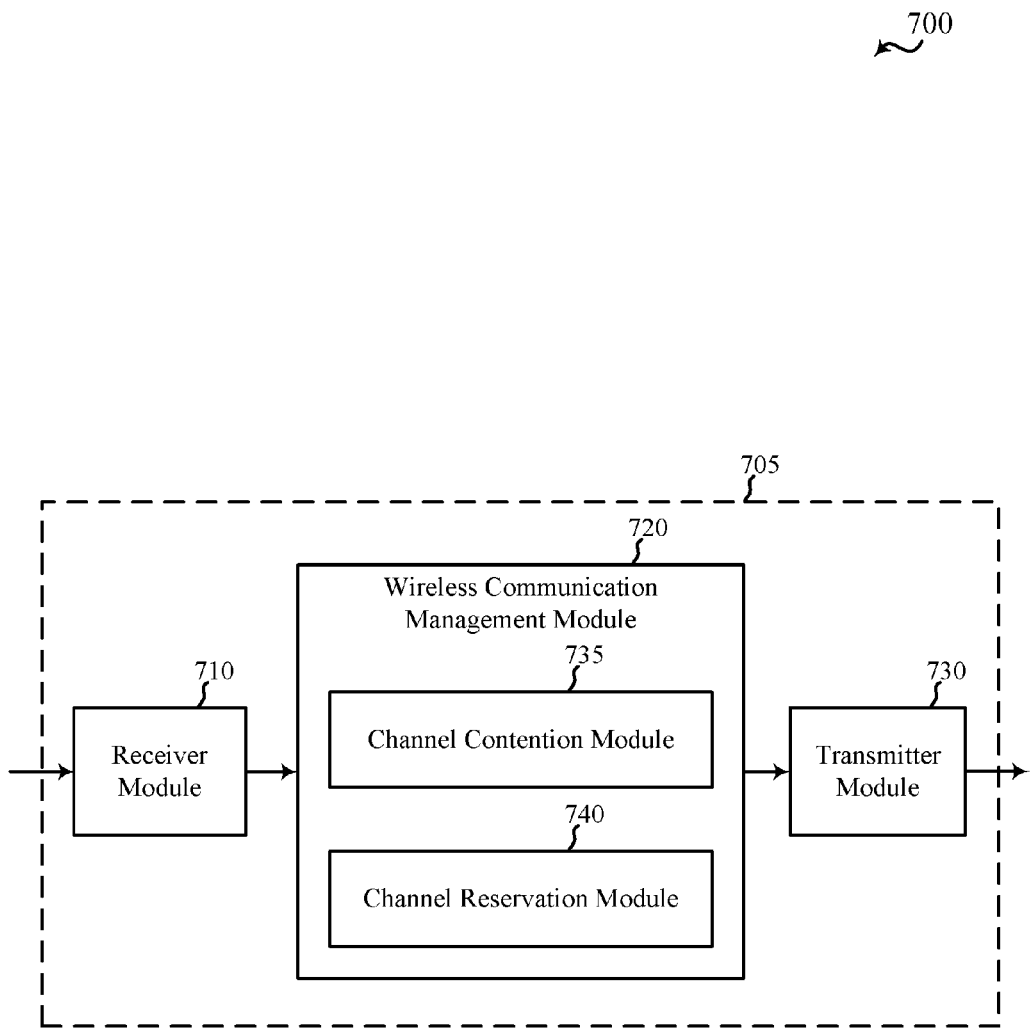
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. The apparatus 705 may be an example of aspects of one or more of the base stations 105, 205, or 205-*a* described with reference to FIG. 1 or 2. The apparatus 705 may also be or include a processor. The apparatus 705 may include a receiver module 710, a wireless communication management module 720, or a transmitter module 730. Each of these modules may be in communication with each other.

The modules of the apparatus 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 710 may include at least one radio frequency (RF) receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1, 2, 3, 4, 5, or 6. The receiver module 710 may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum or the shared radio frequency spectrum.

In some examples, the transmitter module 730 may include at least one RF transmitter, such as at least one RF transmitter operable to transmit over the dedicated radio frequency spectrum or the shared radio frequency spectrum. The transmitter module 730 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum or the shared radio frequency spectrum.

In some examples, the wireless communication management module 720 may be used to manage one or more aspects of wireless communication for a first node including the apparatus 705. In some examples, the wireless communication management module 720 may include a channel contention module 735 or a channel reservation module 740.

In some examples, the channel contention module 735 may be used to contend for access to a first channel of a radio frequency spectrum. The contending may be performed when the first node intends to operate (and occupy the first channel) according to a first radio access technology. In some examples, the first channel may be a channel of the previously mentioned shared radio frequency spectrum. In some examples, the first radio access technology may be a cellular radio access technology, such as an LTE/LTE-A technology.

In some examples, the channel reservation module 740 may be used to transmit a first channel reservation indication upon winning contention for access to the first channel. The first channel reservation indication may be understood by a second node operating according to a second radio access technology. In some examples, the second radio access technology may be a Wi-Fi technology, and the second node may be a Wi-Fi node.

In some examples of the apparatus 705, transmitting the first channel reservation indication may include transmitting the first channel reservation indication on at least one channel of the radio frequency spectrum. For example, the first channel reservation indication may be transmitted on at least the first channel of the radio frequency spectrum. The first channel reservation indication may also or alternatively be transmitted on at least a second channel of the radio frequency spectrum. In some examples, in response to winning contention for access to the first channel, a listen before talk (LBT) procedure (e.g., a shortened CCA procedure) may be performed for the second channel of the radio frequency spectrum, prior to transmitting the first channel reservation indication on the second channel of the radio frequency spectrum. In some examples, the second channel may be adjacent to the first channel, within a same radio frequency spectrum band as the first channel, or within a same radio frequency spectrum sub-band as the first channel. In some examples, transmitting the first channel reservation indication on at least the second channel may include transmitting the first channel reservation indication on a plurality of channels adjacent to the first channel, within a same radio frequency spectrum band as the first channel, or within a same radio frequency spectrum sub-band as the first channel.

In some examples of the apparatus 705, the first channel reservation indication may be transmitted on one channel of the radio frequency spectrum, but indicate at least one other channel occupied by the first radio access technology. The first channel reservation indication may also or alternatively indicate that the channel on which the first channel reservation indication is transmitted is occupied by the first radio access technology.

In some examples of the apparatus 705, the first channel reservation indication may include a Wi-Fi preamble or Wi-Fi packet (e.g., a Wi-Fi CTS-to-Self packet). In some examples, the Wi-Fi preamble or Wi-Fi packet may include an indication that the first node is using the first channel, or an indication that the first node is using the first channel according to the first radio access technology. In some examples of the apparatus 705, the first channel reservation indication may also or alternatively include another type of Wi-Fi transmission, such as a Wi-Fi CTS-to-Self packet. In some examples of the apparatus 705, the first channel reservation indication may include an indication of a time duration for which the first channel (or a group of channels including the first channel) is reserved by the first node.

In some examples of the apparatus 705, the channel reservation module 740 may be used to delay a transmission from the first node to a third node, on the first channel, for a period of time following transmission of the first channel reservation indication. The period of time may be selected to allow the second node to react to the first channel reservation indication (e.g., so that the second node does not begin using the first channel or an interfering channel during the transmission to the third node on the first channel).

Figure 8:
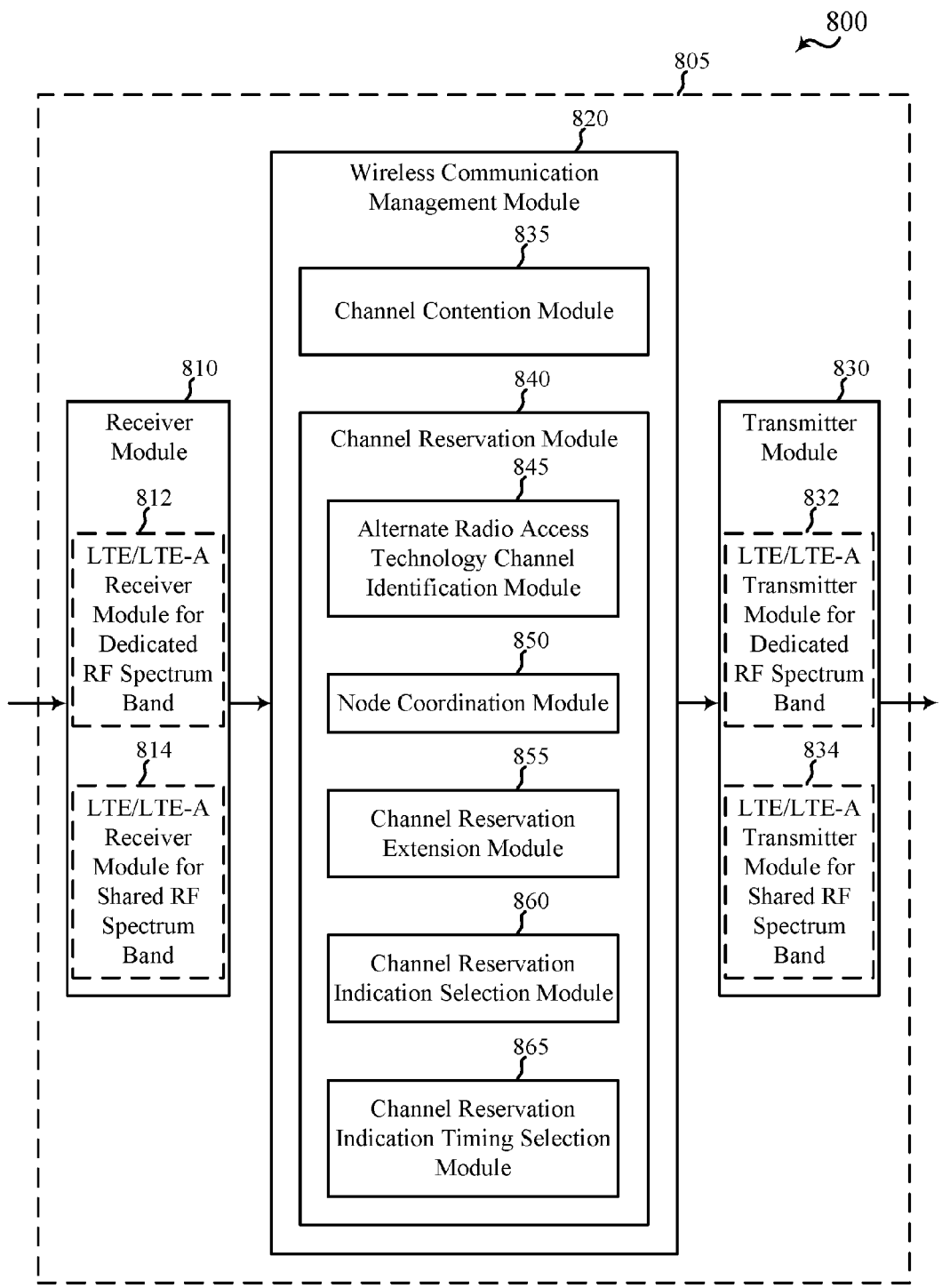
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. The apparatus 805 may be an example of aspects of one or more of the base stations 105, 205, or 205-*a* described with reference to FIG. 1 or 2, or aspects of the apparatus 705 described with reference to FIG. 7. The apparatus 805 may also be or include a processor. The apparatus 805 may include a receiver module 810, a wireless communication management module 820, or a transmitter module 830. Each of these modules may be in communication with each other.

The modules of the apparatus 805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 810 may include at least one RF receiver, such as at least one RF receiver operable to receive transmissions over a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). In some examples, the dedicated radio frequency spectrum or the shared radio frequency spectrum may be used for LTE/LTE-A communications, as described, for example, with reference to FIG. 1, 2, 3, 4, 5, or 6. The receiver module 810 may in some cases include separate receivers for the dedicated radio frequency spectrum and the shared radio frequency spectrum. The separate receivers may, in some examples, take the form of an LTE/LTE-A receiver module for communicating over the dedicated radio frequency spectrum (e.g., LTE/LTE-A receiver module for dedicated RF spectrum 812), and an LTE/LTE-A receiver module for communicating over the shared radio frequency spectrum (e.g., LTE/LTE-A receiver module for shared RF spectrum 814). The receiver module 810, including the LTE/LTE-A receiver module for dedicated RF spectrum 812 or the LTE/LTE-A receiver module for shared RF spectrum 814, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum or the shared radio frequency spectrum.

In some examples, the transmitter module 830 may include at least one RF transmitter, such as at least one RF transmitter operable to transmit over the dedicated radio frequency spectrum or the shared radio frequency spectrum. The transmitter module 830 may in some cases include separate transmitters for the dedicated radio frequency spectrum and the shared radio frequency spectrum. The separate transmitters may, in some examples, take the form of an LTE/LTE-A transmitter module for communicating over the dedicated radio frequency spectrum (e.g., LTE/LTE-A transmitter module for dedicated RF spectrum 832), and an LTE/LTE-A transmitter module for communicating over the shared radio frequency spectrum (e.g., LTE/LTE-A transmitter module for shared RF spectrum 834). The transmitter module 830, including the LTE/LTE-A transmitter module for dedicated RF spectrum 832 or the LTE/LTE-A transmitter module for shared RF spectrum 834, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum or the second radio frequency spectrum.

In some examples, the wireless communication management module 820 may be used to manage one or more aspects of wireless communication for a first node including the apparatus 805. In some examples, the wireless communication management module 820 may include a channel contention module 835 or a channel reservation module 840.

In some examples, the channel contention module 835 may be used to contend for access to a first channel of a radio frequency spectrum. The contending may be performed when the first node intends to operate (and occupy the first channel) according to a first radio access technology. In some examples, the first channel may be a channel of the previously mentioned shared radio frequency spectrum. In some examples, the first radio access technology may be a cellular radio access technology, such as an LTE/LTE-A technology.

In some examples, the channel reservation module 840 may be used to transmit a first channel reservation indication upon winning contention for access to the first channel. The first channel reservation indication may be understood by a second node operating according to a second radio access technology. In some examples, the second radio access technology may be a Wi-Fi technology, and the second node may be a Wi-Fi node. The channel reservation module 840 may also be used to transmit at least one of a CUBS or an F-CUBS upon winning contention for access to the first channel. The CUBS or the F-CUBS may be transmitted (e.g., transmitted on the first channel) to reserve the first channel for use by the first node.

In some examples, the channel reservation module 840 may include an alternate radio access technology channel identification module 845, a node coordination module 850, a channel reservation extension module 855, a channel reservation indication selection module 860, or a channel reservation indication timing selection module 865. In some examples, the alternate radio access technology channel identification module 845 may be used to identify a primary channel used by the second node. When the primary channel used by the second node can be identified, the channel reservation module 840 may be used to transmit the first channel reservation indication on the primary channel used by the second node.

In some examples, the node coordination module 850 may be used to instruct a third node to transmit the first channel reservation indication. The third node may operate according to the first radio access technology, and in examples in which the first node includes a base station, the third node may be a UE. In some examples, the third node may be instructed to transmit the first channel reservation indication over at least one of the first channel or the second channel. In some examples, instructing the third node to transmit the first channel reservation indication may include providing an indication to the third node (e.g., a UE) in at least one of an uplink grant or an RRC signaling message. By way of example, the indication may take the form of an explicit instruction to transmit the first channel reservation indication, or an indication (e.g., a flag, or one or more parameter values) that implicitly instructs the third node to transmit the first channel reservation indication. In some examples, the indication may include one or more parameter values that indicate, for example, the channel(s) on which to transmit the first channel reservation indication, a desired timing for transmitting the first channel reservation indication, or a type of channel reservation indication to be transmitted. In some examples, the third node may be instructed to transmit the first channel reservation indication similarly to how the first node (or the channel reservation module 840) transmits the first channel reservation indication. In some examples, the third node may be instructed to transmit the first channel reservation indication differently from how the first node (or the channel reservation module 840) transmits the first channel reservation indication.

In some examples, the channel reservation extension module 855 may be used to transmit a second channel reservation indication. The second channel reservation indication may be separated in time from the first channel reservation indication, and may extend a reservation of the first channel by the first node. For example, the second channel reservation indication may also be understood by the second node, and may be understood by the second node to reserve at least the first channel for an additional period of time. In some examples, the first channel reservation indication may be transmitted prior to a data transmission by the first node, and the second channel reservation indication may be transmitted during (or multiplexed within) the data transmission by the first node. For example, the second channel reservation indication may puncture a first symbol period of a subframe of the data transmission.

In some examples, the channel reservation indication selection module 860 may be used to select the first channel reservation indication from among a plurality of predetermined channel reservation indications. In some examples, the selecting may be based at least in part on a relative timing of a subframe boundary or symbol period boundary with respect to winning contention for access to the first channel. In some examples, the selecting may be based at least in part on an intended channel occupancy after winning contention for access to the first channel.

In some examples, the channel reservation indication timing selection module 865 may be used to select a time for transmitting the first channel reservation indication with reference to transmitting the F-CUBS or the CUBS. The time may be selected based at least in part on a relative timing of a subframe boundary or symbol period boundary with respect to winning contention for access to the first channel. In some examples, the time for transmitting the first channel reservation indication may be selected to occur during one of: before transmitting the CUBS; after transmitting the CUBS; before transmitting the F-CUBS and the CUBS; after transmitting the F-CUBS and before transmitting the CUBS; or after transmitting the F-CUBS and the CUBS.

In some examples of the apparatus 805, transmitting the first channel reservation indication or the second channel reservation indication may include transmitting the first channel reservation indication or the second channel reservation indication on at least one channel of the radio frequency spectrum. For example, the first channel reservation indication or the second channel reservation indication may be transmitted on at least the first channel of the radio frequency spectrum. The first channel reservation indication or the second channel reservation indication may also or alternatively be transmitted on at least a second channel of the radio frequency spectrum. In some examples, in response to winning contention for access to the first channel, a listen before talk (LBT) procedure (e.g., a shortened CCA procedure) may be performed for the second channel of the radio frequency spectrum, prior to transmitting the first channel reservation indication on the second channel of the radio frequency spectrum. In some examples, the second channel may be adjacent to the first channel, within a same radio frequency spectrum band as the first channel, or within a same radio frequency spectrum sub-band as the first channel. In some examples, transmitting the first channel reservation indication or the second channel reservation indication on at least the second channel may include transmitting the first channel reservation indication or the second channel reservation indication on a plurality of channels adjacent to the first channel, within a same radio frequency spectrum band as the first channel, or within a same radio frequency spectrum sub-band as the first channel.

In some examples of the apparatus 805, the first channel reservation indication or the second channel reservation indication may be transmitted on one channel of the radio frequency spectrum, but indicate at least one other channel occupied by the first radio access technology. The first channel reservation indication or the second channel reservation indication may also or alternatively indicate that the channel on which the first channel reservation indication or the second channel reservation indication is transmitted is occupied by the first radio access technology.

In some examples of the apparatus 805, the first channel reservation indication or the second channel reservation indication may include a Wi-Fi preamble or Wi-Fi packet (e.g., a Wi-Fi CTS-to-Self packet). In some examples, the Wi-Fi preamble or Wi-Fi packet may include an indication that the first node is using the first channel, or an indication that the first node is using the first channel according to the first radio access technology. In some examples of the method 1300, the first channel reservation indication or the second channel reservation indication may also or alternatively include another type of Wi-Fi transmission, such as a Wi-Fi CTS-to-Self packet. In some examples of the method 1300, the first channel reservation indication or the second channel reservation indication may include an indication of a time duration for which the first channel (or a group of channels including the first channel) is reserved by the first node.

In some examples of the apparatus 805, the channel reservation module 840 may be used to delay a transmission from the first node to a third node, on the first channel, for a period of time following transmission of the first channel reservation indication. The period of time may be selected to allow the second node to react to the first channel reservation indication (e.g., so that the second node does not begin using the first channel or an interfering channel during the transmission to the third node on the first channel).

Figure 9:
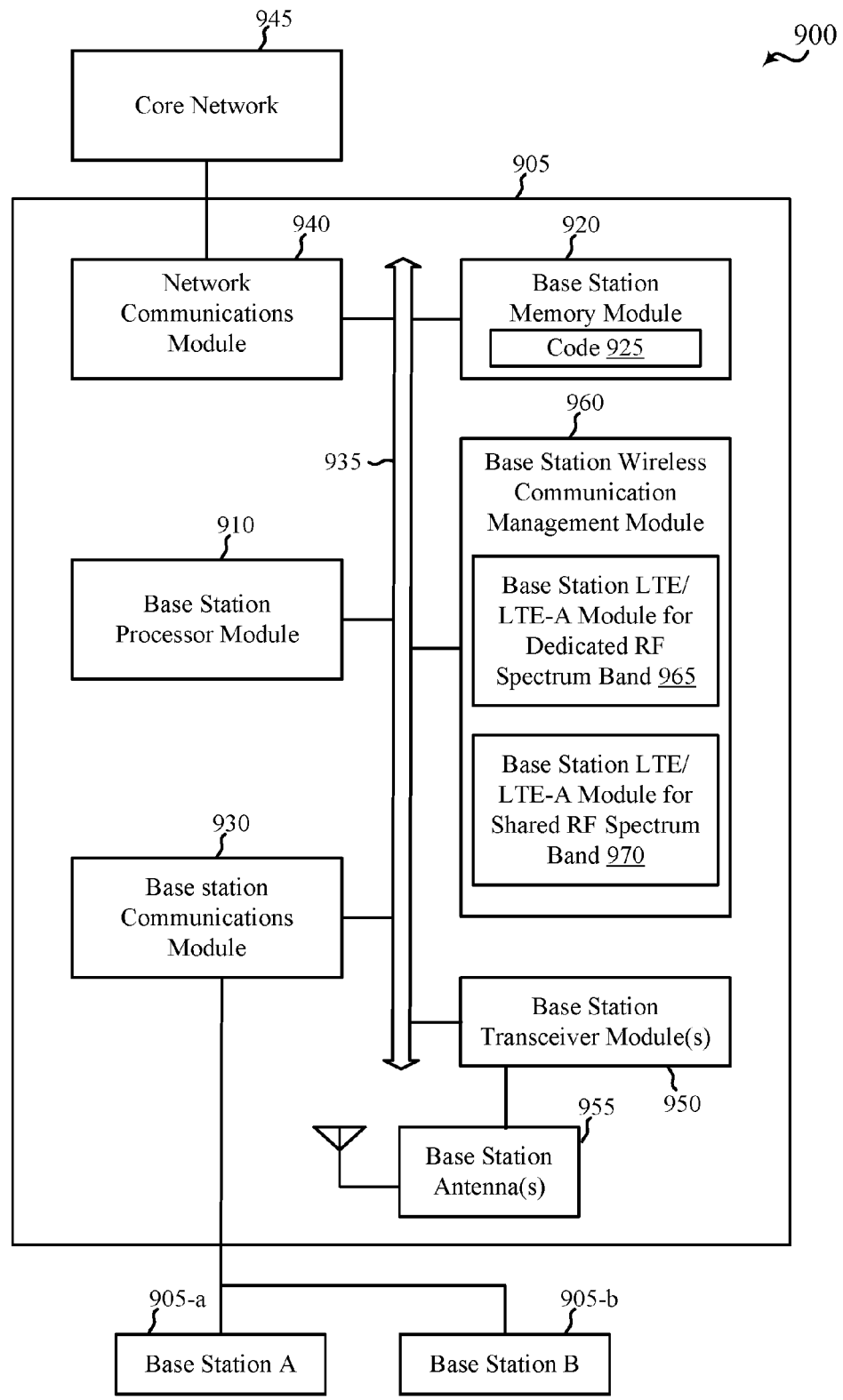
FIG. 9 shows a block diagram of a base station (e.g., a base station forming part or all of an eNB) for use in wireless communication, in accordance with various aspects of the present disclosure.

FIG. 9 shows a block diagram 900 of a base station 905 (e.g., a base station forming part or all of an eNB) for use in wireless communication, in accordance with various aspects of the present disclosure. In some examples, the base station 905 may be an example of one or more aspects of the base station 105, 205, or 205-a described with reference to FIG. 1 or 2, or aspects of one or more of the apparatuses 705 or 805 described with reference to FIG. 7 or 8. The base station 905 may be configured to implement or facilitate at least some of the base station features and functions described with reference to FIG. 1, 2, 3, 4, 5, 6, 7, or 8.

The base station 905 may include a base station processor module 910, a base station memory module 920, at least one base station transceiver module (represented by base station transceiver module(s) 950), at least one base station antenna (represented by base station antenna(s) 955), or a base station wireless communication management module 960. The base station 905 may also include one or more of a base station communications module 930 or a network communications module 940. Each of these components may be in communication with each other, directly or indirectly, over one or more buses 935.

The base station memory module 920 may include random access memory (RAM) or read-only memory (ROM). The base station memory module 920 may store computer-readable, computer-executable code 925 containing instructions that are configured to, when executed, cause the base station processor module 910 to perform various functions described herein related to wireless communication, including the transmission of a channel reservation indication upon winning contention for access to a channel of a radio frequency spectrum. Alternatively, the code 925 may not be directly executable by the base station processor module 910 but be configured to cause the base station 905 (e.g., when compiled and executed) to perform various of the functions described herein.

The base station processor module 910 may include an intelligent hardware device, e.g., a central processing unit (CPU), a microcontroller, an ASIC, etc. The base station processor module 910 may process information received through the base station transceiver module(s) 950, the base station communications module 930, or the network communications module 940. The base station processor module 910 may also process information to be sent to the transceiver module(s) 950 for transmission through the antenna(s) 955, to the base station communications module 930, for transmission to one or more other base stations 905-a and 905-b, or to the network communications module 940 for transmission to a core network 945, which may be an example of one or more aspects of the core network 130 described with reference to FIG. 1. The base station processor module 910 may handle, alone or in connection with the base station wireless communication management module 960, various aspects of communicating over (or managing communications over) a dedicated radio frequency spectrum or a shared radio frequency spectrum. The dedicated radio frequency spectrum may include a radio frequency spectrum for which transmitting apparatuses may not contend for access (e.g., a radio frequency spectrum licensed to particular users for particular uses, such as a licensed radio frequency spectrum usable for LTE/LTE-A communications). The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner).

The base station transceiver module(s) 950 may include a modem configured to modulate packets and provide the modulated packets to the base station antenna(s) 955 for transmission, and to demodulate packets received from the base station antenna(s) 955. The base station transceiver module(s) 950 may, in some examples, be implemented as one or more base station transmitter modules and one or more separate base station receiver modules. The base station transceiver module(s) 950 may support communications in the dedicated radio frequency spectrum or the shared radio frequency spectrum. The base station transceiver module(s) 950 may be configured to communicate bi-directionally, via the antenna(s) 955, with one or more UEs or apparatuses, such as one or more of the UEs 115, 215, 215-a, 215-b, or 215-c described with reference to FIG. 1 or 2. The base station 905 may, for example, include multiple base station antennas 955 (e.g., an antenna array). The base station 905 may communicate with the core network 945 through the network communications module 940. The base station 905 may also communicate with other base stations, such as the base stations 905-a and 905-b, using the base station communications module 930.

The base station wireless communication management module 960 may be configured to perform or control some or all of the features or functions described with reference to FIG. 1, 2, 3, 4, 5, 6, 7, or 8 related to wireless communication over the dedicated radio frequency spectrum or the shared radio frequency spectrum. For example, the base station wireless communication management module 960 may be configured to support a supplemental downlink mode (e.g., a licensed assisted access mode), a carrier aggregation mode, or a standalone mode using the dedicated radio frequency spectrum or the shared radio frequency spectrum. The base station wireless communication management module 960 may include a base station LTE/LTE-A module for dedicated RF spectrum 965 configured to handle LTE/LTE-A communications in the dedicated radio frequency spectrum, and a base station LTE/LTE-A module for shared RF spectrum 970 configured to handle LTE/LTE-A communications in the shared radio frequency spectrum. The base station wireless communication management module 960, or portions of it, may include a processor, or some or all of the functions of the base station wireless communication management module 960 may be performed by the base station processor module 910 or in connection with the base station processor module 910. In some examples, the base station wireless communication management module 960 may be an example of the wireless communication management module 720 or 820 described with reference to FIG. 7 or 8.

Figure 10:
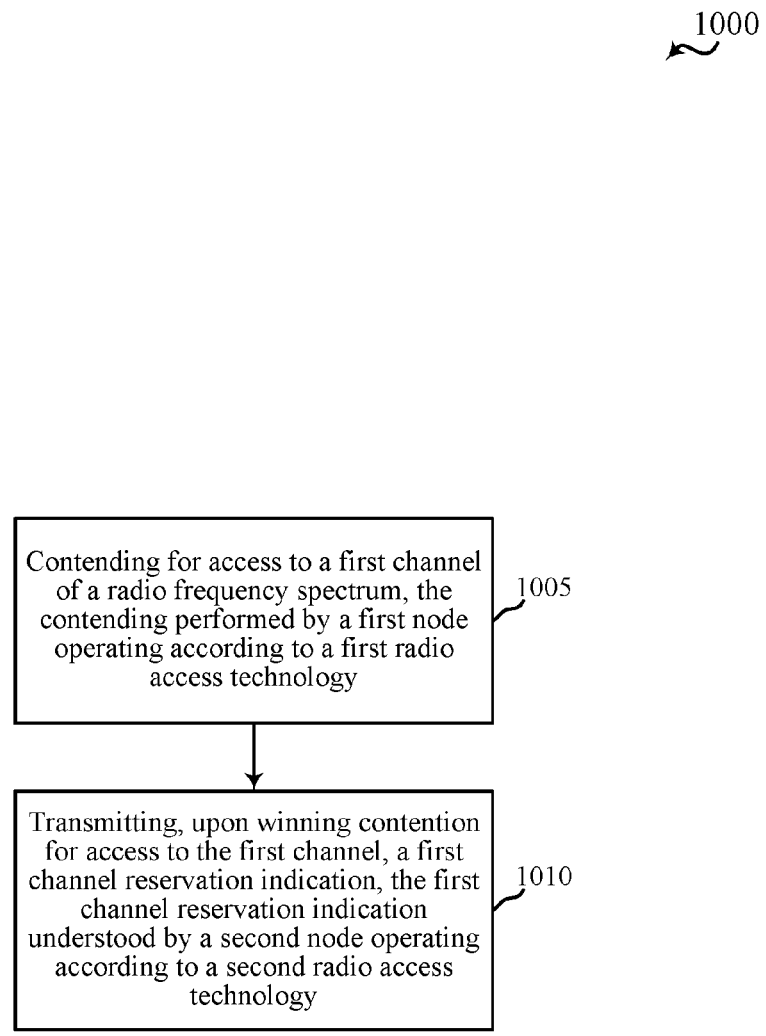
FIG. 10 is a flow chart illustrating an exemplary method for wireless communication, in accordance with various aspects of the present disclosure.

FIG. 10 is a flow chart illustrating an exemplary method 1000 for wireless communication, in accordance with various aspects of the present disclosure. For clarity, the method 1000 is described below with reference to aspects of one or more of the base stations 105, 205, 205-a, or 905 described with reference to FIG. 1, 2, or 9, or aspects of one or more of the apparatuses 705 or 805 described with reference to FIG. 7 or 8. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1005, the method 1000 may include contending for access to a first channel of a radio frequency spectrum. The contending may be performed by a first node operating according to a first radio access technology. In some examples, the radio frequency spectrum may be a shared radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). In some examples, the first radio access technology may be a cellular radio access technology, such as an LTE/LTE-A technology. In some examples, the first node may be a base station. In some examples, the operation(s) at block 1005 may be performed using the wireless communication management module 720, 820, or 960 described with reference to FIG. 7, 8, or 9, or the channel contention module 735 or 835 described with reference to FIG. 7 or 8.

At block 1010, the method 1000 may include transmitting (e.g., by the first node) a first channel reservation indication upon winning contention for access to the first channel. The first channel reservation indication may be understood by a second node operating according to a second radio access technology. In some examples, the second radio access technology may be a Wi-Fi technology, and the second node may be a Wi-Fi node. In some examples, the operation(s) at block 1010 may be performed using the wireless communication management module 720, 820, or 960 described with reference to FIG. 7, 8, or 9, or the channel reservation module 740 or 840 described with reference to FIG. 7 or 8.

In some examples of the method 1000, transmitting the first channel reservation indication may include transmitting the first channel reservation indication on at least one channel of the radio frequency spectrum. For example, the first channel reservation indication may be transmitted on at least the first channel of the radio frequency spectrum. The first channel reservation indication may also or alternatively be transmitted on at least a second channel of the radio frequency spectrum. In some examples, in response to winning contention for access to the first channel, a listen before talk (LBT) procedure (e.g., a shortened CCA procedure) may be performed for the second channel of the radio frequency spectrum, prior to transmitting the first channel reservation indication on the second channel of the radio frequency spectrum. In some examples, the second channel may be adjacent to the first channel, within a same radio frequency spectrum band as the first channel, or within a same radio frequency spectrum sub-band as the first channel. In some examples, transmitting the first channel reservation indication on at least the second channel may include transmitting the first channel reservation indication on a plurality of channels adjacent to the first channel, within a same radio frequency spectrum band as the first channel, or within a same radio frequency spectrum sub-band as the first channel.

In some examples of the method 1000, the first channel reservation indication may be transmitted on one channel of the radio frequency spectrum, but indicate at least one other channel occupied by the first radio access technology. The first channel reservation indication may also or alternatively indicate that the channel on which the first channel reservation indication is transmitted is occupied by the first radio access technology.

In some examples of the method 1000, the first channel reservation indication may include a Wi-Fi preamble or Wi-Fi packet (e.g., a Wi-Fi CTS-to-Self packet). In some examples, the Wi-Fi preamble or Wi-Fi packet may include an indication that the first node is using the first channel, or an indication that the first node is using the first channel according to the first radio access technology. In some examples of the method 1000, the first channel reservation indication may also or alternatively include another type of Wi-Fi transmission, such as a Wi-Fi CTS-to-Self packet. In some examples of the method 1000, the first channel reservation indication may include an indication of a time duration for which the first channel (or a group of channels including the first channel) is reserved by the first node.

In some examples, the method 1000 may include delaying a transmission from the first node to a third node, on the first channel, for a period of time following transmission of the first channel reservation indication. The period of time may be selected to allow the second node to react to the first channel reservation indication (e.g., so that the second node does not begin using the first channel or an interfering channel during the transmission to the third node on the first channel).

Thus, the method 1000 may provide for wireless communication. It should be noted that the method 1000 is just one implementation and that the operations of the method 1000 may be rearranged or otherwise modified such that other implementations are possible.

Figure 11:
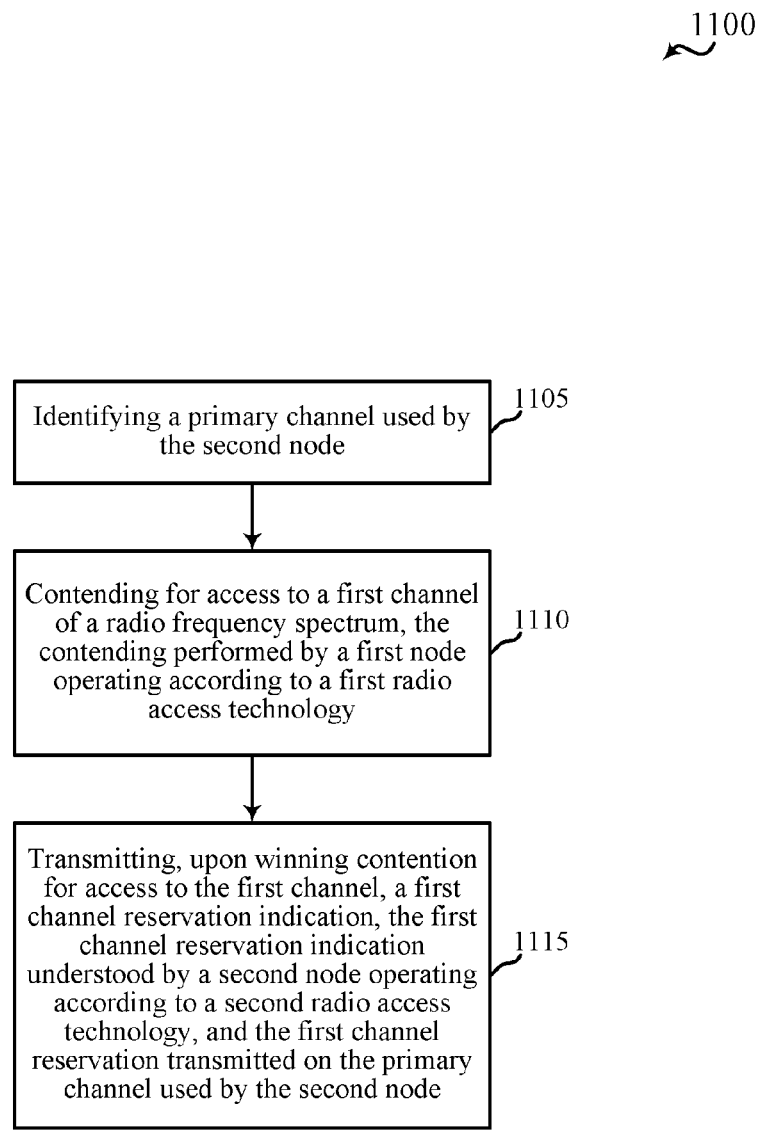
FIG. 11 is a flow chart illustrating an exemplary method for wireless communication, in accordance with various aspects of the present disclosure.

FIG. 11 is a flow chart illustrating an exemplary method 1100 for wireless communication, in accordance with various aspects of the present disclosure. For clarity, the method 1100 is described below with reference to aspects of one or more of the base stations 105, 205, 205-a, or 905 described with reference to FIG. 1, 2, or 9, or aspects of one or more of the apparatuses 705 or 805 described with reference to FIG. 7 or 8. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1105, the method 1100 may include identifying, at a first node operating according to a first radio access technology, a primary channel used by a second node operating according to a second radio access technology. In some examples, the first radio access technology may be a cellular radio access technology, such as an LTE/LTE-A technology. In some examples, the first node may be a base station. In some examples, the second radio access technology may be a Wi-Fi technology, and the second node may be a Wi-Fi node. In some examples, the operation(s) at block 1105 may be performed using the wireless communication management module 720, 820, or 960 described with reference to FIG. 7, 8, or 9, or the alternate radio access technology channel identification module 845 described with reference to FIG. 8.

At block 1110, the method 1100 may include contending for access to a first channel of a radio frequency spectrum. The contending may be performed by the first node. In some examples, the radio frequency spectrum may be a shared radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). In some examples, the operation(s) at block 1110 may be performed using the wireless communication management module 720, 820, or 960 described with reference to FIG. 7, 8, or 9, or the channel contention module 735 or 835 described with reference to FIG. 7 or 8.

At block 1115, the method 1100 may include transmitting (e.g., by the first node) a first channel reservation indication upon winning contention for access to the first channel. The first channel reservation indication may be understood by the second node, and may be transmitted on the primary channel used by the second node. In some examples, the operation(s) at block 1115 may be performed using the wireless communication management module 720, 820, or 960 described with reference to FIG. 7, 8, or 9, or the channel reservation module 740 or 840 described with reference to FIG. 7 or 8.

In some examples of the method 1100, the first channel reservation indication may be transmitted on at least the first channel of the radio frequency spectrum. The first channel reservation indication may also or alternatively be transmitted on at least a second channel of the radio frequency spectrum. In some examples, in response to winning contention for access to the first channel, a listen before talk (LBT) procedure (e.g., a shortened CCA procedure) may be performed for the second channel of the radio frequency spectrum, prior to transmitting the first channel reservation indication on the second channel of the radio frequency spectrum. In some examples, the second channel may be adjacent to the first channel, within a same radio frequency spectrum band as the first channel, or within a same radio frequency spectrum sub-band as the first channel. In some examples, transmitting the first channel reservation indication on at least the second channel may include transmitting the first channel reservation indication on a plurality of channels adjacent to the first channel, within a same radio frequency spectrum band as the first channel, or within a same radio frequency spectrum sub-band as the first channel.

In some examples of the method 1100, the first channel reservation indication may be transmitted on one channel of the radio frequency spectrum (e.g., the primary channel used by the second node), but indicate at least one other channel occupied by the first radio access technology (e.g., the first channel). The first channel reservation indication may also or alternatively indicate that the channel on which the first channel reservation indication is transmitted is occupied by the first radio access technology (e.g., the primary channel used by the second node may overlap the first channel cleared by the first node).

In some examples of the method 1100, the first channel reservation indication may include a Wi-Fi preamble or Wi-Fi packet (e.g., a Wi-Fi CTS-to-Self packet). In some examples, the Wi-Fi preamble or Wi-Fi packet may include an indication that the first node is using the first channel, or an indication that the first node is using the first channel according to the first radio access technology. In some examples of the method 1100, the first channel reservation indication may also or alternatively include another type of Wi-Fi transmission, such as a Wi-Fi CTS-to-Self packet. In some examples of the method 1100, the first channel reservation indication may include an indication of a time duration for which the first channel (or a group of channels including the first channel) is reserved by the first node.

Thus, the method 1100 may provide for wireless communication. It should be noted that the method 1100 is just one implementation and that the operations of the method 1100 may be rearranged or otherwise modified such that other implementations are possible.

Figure 12:
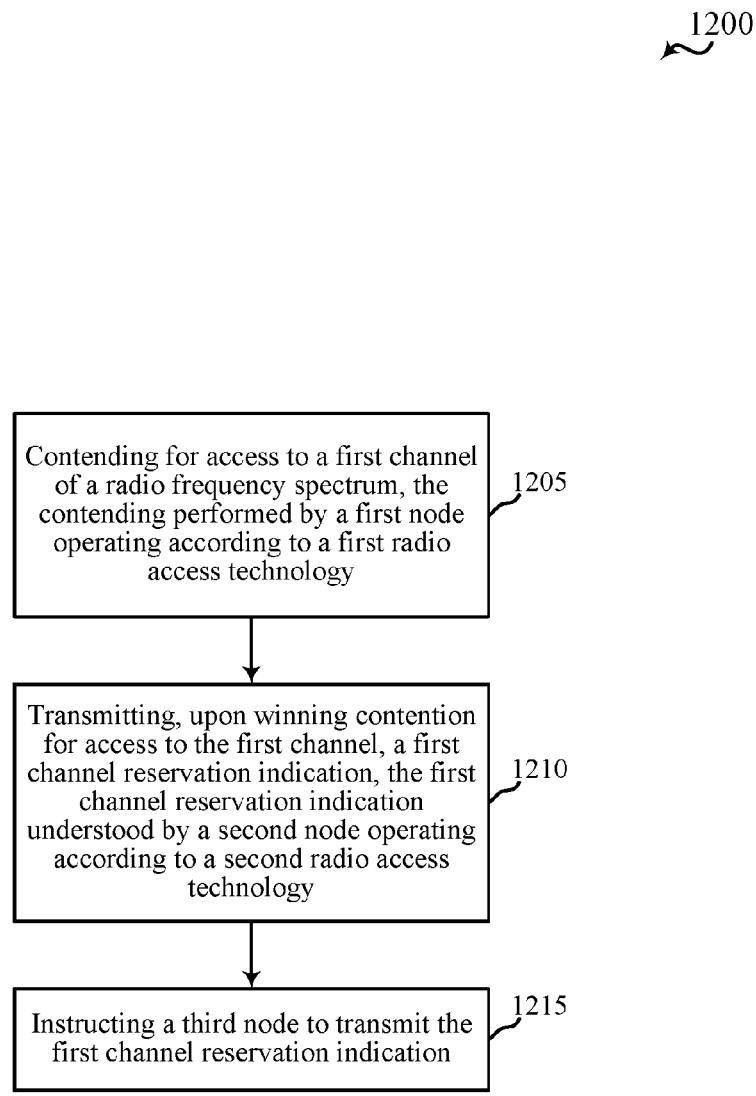
FIG. 12 is a flow chart illustrating an exemplary method for wireless communication, in accordance with various aspects of the present disclosure.

FIG. 12 is a flow chart illustrating an exemplary method 1200 for wireless communication, in accordance with various aspects of the present disclosure. For clarity, the method 1200 is described below with reference to aspects of one or more of the base stations 105, 205, 205-a, or 905 described with reference to FIG. 1, 2, or 9, or aspects of one or more of the apparatuses 705 or 805 described with reference to FIG. 7 or 8. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1205, the method 1200 may include contending for access to a first channel of a radio frequency spectrum. The contending may be performed by a first node operating according to a first radio access technology. In some examples, the radio frequency spectrum may be a shared radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). In some examples, the first radio access technology may be a cellular radio access technology, such as an LTE/LTE-A technology. In some examples, the first node may be a base station. In some examples, the operation(s) at block 1205 may be performed using the wireless communication management module 720, 820, or 960 described with reference to FIG. 7, 8, or 9, or the channel contention module 735 or 835 described with reference to FIG. 7 or 8.

At block 1210, the method 1200 may include transmitting (e.g., by the first node) a first channel reservation indication upon winning contention for access to the first channel. The first channel reservation indication may be understood by a second node operating according to a second radio access technology. In some examples, the second radio access technology may be a Wi-Fi technology, and the second node may be a Wi-Fi node. In some examples, the operation(s) at block 1210 may be performed using the wireless communication management module 720, 820, or 960 described with reference to FIG. 7, 8, or 9, or the channel reservation module 740 or 840 described with reference to FIG. 7 or 8.

At block 1215, the method 1200 may include instructing a third node to transmit the first channel reservation indication. The third node may operate according to the first radio access technology, and in examples in which the first node includes a base station, the third node may be a UE. In some examples, the third node may be instructed to transmit the first channel reservation indication over at least one of the first channel or the second channel. In some examples, instructing the third node to transmit the first channel reservation indication may include providing an indication to the third node (e.g., a UE) in at least one of an uplink grant or an RRC signaling message. By way of example, the indication may take the form of an explicit instruction to transmit the first channel reservation indication, or an indication (e.g., a flag, or one or more parameter values) that implicitly instructs the third node to transmit the first channel reservation indication. In some examples, the indication may include one or more parameter values that indicate, for example, the channel(s) on which to transmit the first channel reservation indication, a desired timing for transmitting the first channel reservation indication, or a type of channel reservation indication to be transmitted. In some examples, the operation(s) at block 1215 may be performed using the wireless communication management module 720, 820, or 960 described with reference to FIG. 7, 8, or 9, or the node coordination module 850 described with reference to FIG. 8.

In some examples of the method 1200, transmitting the first channel reservation indication may include transmitting the first channel reservation indication on at least one channel of the radio frequency spectrum. For example, the first channel reservation indication may be transmitted on at least the first channel of the radio frequency spectrum. The first channel reservation indication may also or alternatively be transmitted on at least a second channel of the radio frequency spectrum. In some examples, the second channel may be adjacent to the first channel, within a same radio frequency spectrum band as the first channel, or within a same radio frequency spectrum sub-band as the first channel. In some examples, transmitting the first channel reservation indication on at least the second channel may include transmitting the first channel reservation indication on a plurality of channels adjacent to the first channel, within a same radio frequency spectrum band as the first channel, or within a same radio frequency spectrum sub-band as the first channel.

In some examples of the method 1200, the first channel reservation indication may be transmitted on one channel of the radio frequency spectrum, but indicate at least one other channel occupied by the first radio access technology. The first channel reservation indication may also or alternatively indicate that the channel on which the first channel reservation indication is transmitted is occupied by the first radio access technology.

In some examples of the method 1200, the first channel reservation indication may include a Wi-Fi preamble or Wi-Fi packet (e.g., a Wi-Fi CTS-to-Self packet). In some examples, the Wi-Fi preamble or Wi-Fi packet may include an indication that the first node is using the first channel, or an indication that the first node is using the first channel according to the first radio access technology. In some examples of the method 1200, the first channel reservation indication may also or alternatively include another type of Wi-Fi transmission, such as a Wi-Fi CTS-to-Self packet. In some examples of the method 1200, the first channel reservation indication may include an indication of a time duration for which the first channel (or a group of channels including the first channel) is reserved by the first node.

In some examples of the method 1200, the third node may be instructed to transmit the first channel reservation indication similarly to how the first node transmits the first channel reservation indication. In some examples of the method 1200, the third node may be instructed to transmit the first channel reservation indication differently from how the first node transmits the first channel reservation indication.

Thus, the method 1200 may provide for wireless communication. It should be noted that the method 1200 is just one implementation and that the operations of the method 1200 may be rearranged or otherwise modified such that other implementations are possible.

Figure 13:
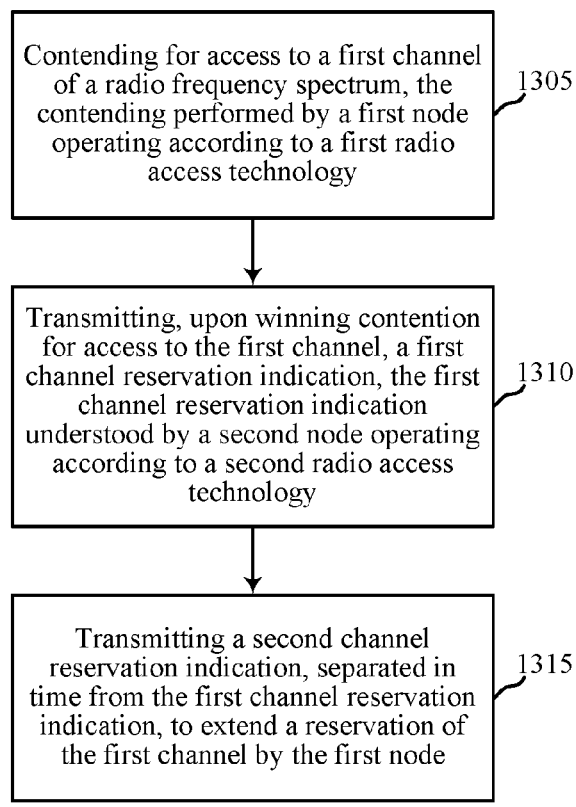
FIG. 13 is a flow chart illustrating an exemplary method for wireless communication, in accordance with various aspects of the present disclosure.

FIG. 13 is a flow chart illustrating an exemplary method 1300 for wireless communication, in accordance with various aspects of the present disclosure. For clarity, the method 1300 is described below with reference to aspects of one or more of the base stations 105, 205, 205-*a*, or 905 described with reference to FIG. 1, 2, or 9, or aspects of one or more of the apparatuses 705 or 805 described with reference to FIG. 7 or 8. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1305, the method 1300 may include contending for access to a first channel of a radio frequency spectrum. The contending may be performed by a first node operating according to a first radio access technology. In some examples, the radio frequency spectrum may be a shared radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). In some examples, the first radio access technology may be a cellular radio access technology, such as an LTE/LTE-A technology. In some examples, the first node may be a base station. In some examples, the operation(s) at block 1305 may be performed using the wireless communication management module 720, 820, or 960 described with reference to FIG. 7, 8, or 9, or the channel contention module 735 or 835 described with reference to FIG. 7 or 8.

At block 1310, the method 1300 may include transmitting (e.g., by the first node) a first channel reservation indication upon winning contention for access to the first channel. The first channel reservation indication may be understood by a second node operating according to a second radio access technology, and may be understood by the second node to reserve at least the first channel for a period of time. In some examples, the second radio access technology may be a Wi-Fi technology, and the second node may be a Wi-Fi node. In some examples, the operation(s) at block 1310 may be performed using the wireless communication management module 720, 820, or 960 described with reference to FIG. 7, 8, or 9, or the channel reservation module 740 or 840 described with reference to FIG. 7 or 8.

At block 1315, the method 1300 may include transmitting (e.g., by the first node) a second channel reservation indication. The second channel reservation indication may be separated in time from the first channel reservation indication, and may extend a reservation of the first channel by the first node. For example, the second channel reservation indication may also be understood by the second node, and may be understood by the second node to reserve at least the first channel for an additional period of time. In some examples, the operation(s) at block 1315 may be performed using the wireless communication management module 720, 820, or 960 described with reference to FIG. 7, 8, or 9, or the channel reservation extension module 855 described with reference to FIG. 8.

In some examples of the method 1300, transmitting the first channel reservation indication or the second channel reservation indication may include transmitting the first channel reservation indication or the second channel reservation indication on at least one channel of the radio frequency spectrum. For example, the first channel reservation indication or the second channel reservation indication may be transmitted on at least the first channel of the radio frequency spectrum. The first channel reservation indication or the second channel reservation indication may also or alternatively be transmitted on at least a second channel of the radio frequency spectrum. In some examples, in response to winning contention for access to the first channel, a listen before talk (LBT) procedure (e.g., a shortened CCA procedure) may be performed for the second channel of the radio frequency spectrum, prior to transmitting the first channel reservation indication on the second channel of the radio frequency spectrum. In some examples, the second channel may be adjacent to the first channel, within a same radio frequency spectrum band as the first channel, or within a same radio frequency spectrum sub-band as the first channel. In some examples, transmitting the first channel reservation indication or the second channel reservation indication on at least the second channel may include transmitting the first channel reservation indication or the second channel reservation indication on a plurality of channels adjacent to the first channel, within a same radio frequency spectrum band as the first channel, or within a same radio frequency spectrum sub-band as the first channel.

In some examples of the method 1300, the first channel reservation indication or the second channel reservation indication may be transmitted on one channel of the radio frequency spectrum, but indicate at least one other channel occupied by the first radio access technology. The first channel reservation indication or the second channel reservation indication may also or alternatively indicate that the channel on which the first channel reservation indication or the second channel reservation indication is transmitted is occupied by the first radio access technology.

In some examples of the method 1300, the first channel reservation indication or the second channel reservation indication may include a Wi-Fi preamble or Wi-Fi packet (e.g., a Wi-Fi CTS-to-Self packet). In some examples, the Wi-Fi preamble or Wi-Fi packet may include an indication that the first node is using the first channel, or an indication that the first node is using the first channel according to the first radio access technology. In some examples of the method 1300, the first channel reservation indication or the second channel reservation indication may also or alternatively include another type of Wi-Fi transmission, such as a Wi-Fi CTS-to-Self packet. In some examples of the method 1300, the first channel reservation indication or the second channel reservation indication may include an indication of a time duration for which the first channel (or a group of channels including the first channel) is reserved by the first node.

In some examples of the method 1300, the first channel reservation indication may be transmitted prior to a data transmission by the first node, and the second channel reservation indication may be transmitted during (or multiplexed within) the data transmission by the first node. For example, the second channel reservation indication may puncture a first symbol period of a subframe of the data transmission.

Thus, the method 1300 may provide for wireless communication. It should be noted that the method 1300 is just one implementation and that the operations of the method 1300 may be rearranged or otherwise modified such that other implementations are possible.

Figure 14:
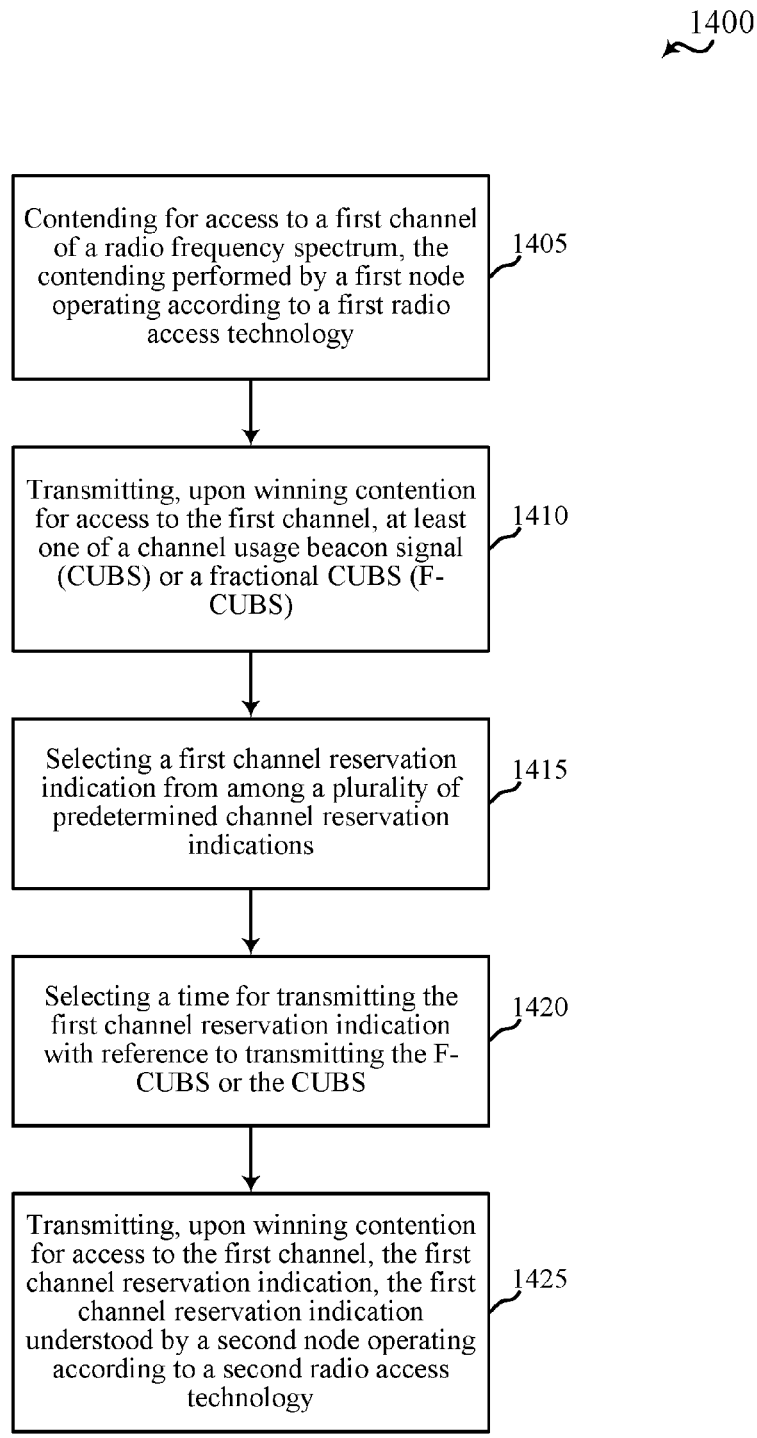
FIG. 14 is a flow chart illustrating an exemplary method for wireless communication, in accordance with various aspects of the present disclosure.

FIG. 14 is a flow chart illustrating an exemplary method 1400 for wireless communication, in accordance with various aspects of the present disclosure. For clarity, the method 1400 is described below with reference to aspects of one or more of the base stations 105, 205, 205-*a*, or 905 described with reference to FIG. 1, 2, or 9, or aspects of one or more of the apparatuses 705 or 805 described with reference to FIG. 7 or 8. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 1405, the method 1400 may include contending for access to a first channel of a radio frequency spectrum. The contending may be performed by a first node operating according to a first radio access technology. In some examples, the radio frequency spectrum may be a shared radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner). In some examples, the first radio access technology may be a cellular radio access technology, such as an LTE/LTE-A technology. In some examples, the first node may be a base station. In some examples, the operation(s) at block 1405 may be performed using the wireless communication management module 720, 820, or 960 described with reference to FIG. 7, 8, or 9, or the channel contention module 735 or 835 described with reference to FIG. 7 or 8.

At block 1410, the method 1400 may include transmitting, upon winning contention for access to the first channel, at least one of a CUBS or an F-CUBS, to reserve the first channel for use by the first node. In some examples, the operation(s) at block 1410 may be performed using the wireless communication management module 720, 820, or 960 described with reference to FIG. 7, 8, or 9, or the channel reservation module 740 or 840 described with reference to FIG. 7 or 8.

At block 1415, the method 1400 may include selecting a first channel reservation indication from among a plurality of predetermined channel reservation indications. In some examples, the selecting may be based at least in part on a relative timing of a subframe boundary or symbol period boundary with respect to winning contention for access to the first channel. In some examples, the selecting may be based at least in part on an intended channel occupancy after winning contention for access to the first channel. In some examples, the operation(s) at block 1415 may be performed using the wireless communication management module 720, 820, or 960 described with reference to FIG. 7, 8, or 9, or the channel reservation indication selection module 860 described with reference to FIG. 8.

At block 1420, the method 1400 may include selecting a time for transmitting the first channel reservation indication with reference to transmitting the F-CUBS or the CUBS. The time may be selected based at least in part on a relative timing of a subframe boundary or symbol period boundary with respect to winning contention for access to the first channel. In some examples, the time for transmitting the first channel reservation indication may be selected to occur during one of: before transmitting the CUBS; after transmitting the CUBS; before transmitting the F-CUBS and the CUBS; after transmitting the F-CUBS and before transmitting the CUBS; or after transmitting the F-CUBS and the CUBS. In some examples, the operation(s) at block 1420 may be performed using the wireless communication management module 720, 820, or 960 described with reference to FIG. 7, 8, or 9, or the channel reservation indication timing selection module 865 described with reference to FIG. 8.

In some examples, the method 1400 may include the operation(s) performed at blocks 1415 and 1420. In other examples, the method 1400 may include the operation(s) performed at block 1415, but not the operation(s) performed at block 1420. In other examples, the method 1400 may include the operation(s) performed at block 1420, but not the operation(s) performed at block 1415.

At block 1425, the method 1400 may include transmitting (e.g., by the first node) the first channel reservation indication upon winning contention for access to the first channel. The first channel reservation indication may be understood by a second node operating according to a second radio access technology. In some examples, the second radio access technology may be a Wi-Fi technology, and the second node may be a Wi-Fi node. In some examples, the operation(s) at block 1410 may be performed using the wireless communication management module 720, 820, or 960 described with reference to FIG. 7, 8, or 9, or the channel reservation module 740 or 840 described with reference to FIG. 7 or 8.

In some examples of the method 1400, transmitting the first channel reservation indication may include transmitting the first channel reservation indication on at least one channel of the radio frequency spectrum. For example, the first channel reservation indication may be transmitted on at least the first channel of the radio frequency spectrum. The first channel reservation indication may also or alternatively be transmitted on at least a second channel of the radio frequency spectrum. In some examples, in response to winning contention for access to the first channel, a listen before talk (LBT) procedure (e.g., a shortened CCA procedure) may be performed for the second channel of the radio frequency spectrum, prior to transmitting the first channel reservation indication on the second channel of the radio frequency spectrum. In some examples, the second channel may be adjacent to the first channel, within a same radio frequency spectrum band as the first channel, or within a same radio frequency spectrum sub-band as the first channel. In some examples, transmitting the first channel reservation indication on at least the second channel may include transmitting the first channel reservation indication on a plurality of channels adjacent to the first channel, within a same radio frequency spectrum band as the first channel, or within a same radio frequency spectrum sub-band as the first channel.

In some examples of the method 1400, the first channel reservation indication may be transmitted on one channel of the radio frequency spectrum, but indicate at least one other channel occupied by the first radio access technology. The first channel reservation indication may also or alternatively indicate that the channel on which the first channel reservation indication is transmitted is occupied by the first radio access technology.

In some examples of the method 1400, the first channel reservation indication may include a Wi-Fi preamble or Wi-Fi packet (e.g., a Wi-Fi CTS-to-Self packet). In some examples, the Wi-Fi preamble or Wi-Fi packet may include an indication that the first node is using the first channel, or an indication that the first node is using the first channel according to the first radio access technology. In some examples of the method 1400, the first channel reservation indication may also or alternatively include another type of Wi-Fi transmission, such as a Wi-Fi CTS-to-Self packet. In some examples of the method 1400, the first channel reservation indication may include an indication of a time duration for which the first channel (or a group of channels including the first channel) is reserved by the first node.

Thus, the method 1400 may provide for wireless communication. It should be noted that the method 1400 is just one implementation and that the operations of the method 1400 may be rearranged or otherwise modified such that other implementations are possible.

In some examples, aspects from two or more of the methods 1000, 1100, 1200, 1300, or 1400 described with reference to FIG. 10, 11, 12, 13, or 14 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
    contending for access to a first channel of a radio frequency spectrum, the contending performed by a first node operating according to a first radio access technology;
    transmitting, upon winning contention for access to the first channel, a first channel reservation indication, the first channel reservation indication decodable by a second node operating according to a second radio access technology; and transmitting, upon winning contention for access to the first channel, at least one of a channel usage beacon signal (CUBS) or a fractional CUBS (F-CUBS);

wherein transmitting the first channel reservation indication occurs during one of: before transmitting the CUBS; after transmitting the CUBS; before transmitting the F-CUBS and the CUBS; after transmitting the F-CUBS and before transmitting the CUBS; or after transmitting the F-CUBS and the CUBS.

2. The method of claim 1, wherein transmitting the first channel reservation indication comprises:
   transmitting the first channel reservation indication on at least the first channel of the radio frequency spectrum.

3. The method of claim 1, wherein transmitting the first channel reservation indication comprises:
   transmitting the first channel reservation indication on at least a second channel of the radio frequency spectrum.

4. The method of claim 3, wherein transmitting the first channel reservation indication on at least the second channel comprises:
   transmitting the first channel reservation indication on a plurality of channels.

5. The method of claim 1, further comprising:
   identifying a primary channel used by the second node;
   wherein transmitting the first channel reservation indication comprises transmitting the first channel reservation indication on the primary channel used by the second node.

6. The method of claim 1, wherein transmitting the first channel reservation indication comprises:
   transmitting the first channel reservation indication on at least one channel of the radio frequency spectrum, the first channel reservation indication transmitted on the one channel of the radio frequency spectrum indicating at least one other channel occupied by the first radio access technology.

7. The method of claim 1, further comprising:
   instructing a third node to transmit the first channel reservation indication over at least one of: the first channel or the second channel.

8. The method of claim 1, further comprising:
   instructing a third node to transmit the first channel reservation indication, and providing an indication to the UE in at least one of: an uplink grant or a radio resource control (RRC) signaling message; and
   wherein the first node comprises a base station and the third node comprises a user equipment (UE).

9. The method of claim 1, wherein the first channel reservation indication comprises a Wi-Fi preamble or Wi-Fi packet.

10. The method of claim 9, further comprising:
    including in the Wi-Fi preamble an indication that the first node is using the first channel according to the first radio access technology.

11. The method of claim 1, further comprising:
    delaying a transmission from the first node to a third node, on the first channel, for a period of time following transmission of the first channel reservation indication, the period of time allowing the second node to react to the first channel reservation indication.

12. The method of claim 1, wherein the first channel reservation indication is associated with reserving at least the first channel for a period of time, the method further comprising:

transmitting a second channel reservation indication, separated in time from the first channel reservation indication, to extend a reservation of the first channel by the first node.

13. The method of claim 1, further comprising:
    selecting the first channel reservation indication from among a plurality of predetermined channel reservation indications, the selecting based at least in part on either a relative timing of a subframe boundary or symbol period boundary with respect to winning contention for access to the first channel, or an intended channel occupancy after winning contention for access to the first channel.

14. The method of claim 1, further comprising:
    selecting a time for transmitting the first channel reservation indication with reference to transmitting the F-CUBS or the CUBS, the time selected based at least in part on a relative timing of a subframe boundary or symbol period boundary with respect to winning contention for access to the first channel.

15. An apparatus for wireless communication, comprising:
    a processor;
    memory in electronic communication with the processor; and
    instructions stored in the memory, the instructions being executable by the processor to:
    contend for access to a first channel of a radio frequency spectrum, the contending performed by a first node operating according to a first radio access technology;
    transmit, upon winning contention for access to the first channel, a first channel reservation indication, the first channel reservation indication decodable by a second node operating according to a second radio access technology; and
    transmit, upon winning contention for access to the first channel, at least one of a channel usage beacon signal (CUBS) or a fractional CUBS (F-CUBS);
    wherein transmitting the first channel reservation indication occurs during one of: before transmitting the CUBS; after transmitting the CUBS; before transmitting the F-CUBS and the CUBS; after transmitting the F-CUBS and before transmitting the CUBS; or after transmitting the F-CUBS and the CUBS.

16. The apparatus of claim 15, wherein the instructions executable by the processor to transmit the first channel reservation indication comprise instructions executable by the processor to:
    transmit the first channel reservation indication on at least either the first channel of the radio frequency spectrum, or a second channel of the radio frequency spectrum.

17. The apparatus of claim 16, wherein the second channel is at least one of:
    adjacent to the first channel, within a same radio frequency spectrum band as the first channel, or within a same radio frequency spectrum sub-band as the first channel.

18. The apparatus of claim 15, wherein the instructions are executable by the processor to:
    identify a primary channel used by the second node;
    wherein the instructions executable by the processor to transmit the first channel reservation indication comprise instructions executable by the processor to transmit the first channel reservation indication on the primary channel used by the second node.

19. The apparatus of claim 15, wherein the instructions executable by the processor to transmit the first channel reservation indication comprise instructions executable by the processor to:
transmit the first channel reservation indication on at least one channel of the radio frequency spectrum, the first channel reservation indication transmitted on the one channel of the radio frequency spectrum indicating at least one other channel occupied by the first radio access technology.

20. The apparatus of claim 15, wherein the instructions are executable by the processor to:
select the first channel reservation indication from among a plurality of predetermined channel reservation indications, the selecting based at least in part on either a relative timing of a subframe boundary or symbol period boundary with respect to winning contention for access to the first channel, or an intended channel occupancy after winning contention for access to the first channel.

21. An apparatus for wireless communication, comprising:
means for contending for access to a first channel of a radio frequency spectrum, the contending performed by a first node operating according to a first radio access technology;
means for transmitting, upon winning contention for access to the first channel, a first channel reservation indication, the first channel reservation indication decodable by a second node operating according to a second radio access technology; and
means for transmitting, upon winning contention for access to the first channel, at least one of a channel usage beacon signal (CUBS) or a fractional CUBS (F-CUBS);
wherein the means for transmitting the first channel reservation indication occurs during one of: before transmitting the CUBS; after transmitting the CUBS; before transmitting the F-CUBS and the CUBS; after transmitting the F-CUBS and before transmitting the CUBS; or after transmitting the F-CUBS and the CUBS.

22. The apparatus of claim 21, further comprising:
means for identifying a primary channel used by the second node;
wherein the means for transmitting the first channel reservation indication comprises means for transmitting the first channel reservation indication on the primary channel used by the second node.

23. The apparatus of claim 21, wherein the means for transmitting the first channel reservation indication comprises:
means for transmitting the first channel reservation indication on at least one channel of the radio frequency spectrum, the first channel reservation indication transmitted on the one channel of the radio frequency spectrum indicating at least one other channel occupied by the first radio access technology.

24. The apparatus of claim 21, further comprising:
means for delaying a transmission from the first node to a third node, on the first channel, for a period of time following transmission of the first channel reservation indication, the period of time allowing the second node to react to the first channel reservation indication.

25. The apparatus of claim 21, wherein the first channel reservation indication is associated with reserving at least the first channel for a period of time, the apparatus further comprising:
means for transmitting a second channel reservation indication, separated in time from the first channel reservation indication, to extend a reservation of the first channel by the first node.

26. The apparatus of claim 21, further comprising:
means for selecting the first channel reservation indication from among a plurality of predetermined channel reservation indications, the selecting based at least in part on either a relative timing of a subframe boundary or symbol period boundary with respect to winning contention for access to the first channel, or an intended channel occupancy after winning contention for access to the first channel.

27. The apparatus of claim 21, further comprising:
means for selecting a time for transmitting the first channel reservation indication with reference to transmitting the F-CUBS or the CUBS, the time selected based at least in part on a relative timing of a subframe boundary or symbol period boundary with respect to winning contention for access to the first channel.

28. A non-transitory computer-readable medium for storing instructions executable by a processor, comprising:
instructions to contend for access to a first channel of a radio frequency spectrum, the contending performed by a first node operating according to a first radio access technology;
instructions to transmit, upon winning contention for access to the first channel, a first channel reservation indication, the first channel reservation indication decodable by a second node operating according to a second radio access technology; and
instructions to transmit, upon winning contention for access to the first channel, at least one of a channel usage beacon signal (CUBS) or a fractional CUBS (F-CUBS);
wherein transmitting the first channel reservation indication occurs during one of: before transmitting the CUBS; after transmitting the CUBS; before transmitting the F-CUBS and the CUBS; after transmitting the F-CUBS and before transmitting the CUBS; or after transmitting the F-CUBS and the CUBS.

* * * * *